US009131595B2

(12) United States Patent
Creyghton et al.

(10) Patent No.: US 9,131,595 B2
(45) Date of Patent: Sep. 8, 2015

(54) SURFACE DIELECTRIC BARRIER DISCHARGE PLASMA UNIT AND A METHOD OF GENERATING A SURFACE PLASMA

(75) Inventors: Yves Lodewijk Maria Creyghton, Delft (NL); Marcel Simor, Rijswijk (NL); Timo Huijser, Zoetermeer (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 908 days.

(21) Appl. No.: 12/521,473

(22) PCT Filed: Dec. 28, 2007

(86) PCT No.: PCT/NL2007/050707

§ 371 (c)(1), (2), (4) Date: Mar. 3, 2010

(87) PCT Pub. No.: WO2008/082297

PCT Pub. Date: Jul. 10, 2008

(65) Prior Publication Data

US 2010/0175987 A1 Jul. 15, 2010

(30) Foreign Application Priority Data

Dec. 28, 2006 (EP) .................................... 06077329
Jul. 19, 2007 (EP) .................................... 07112805

(51) Int. Cl.
*B01J 19/08* (2006.01)
*H05H 1/24* (2006.01)

(52) U.S. Cl.
CPC ....... *H05H 1/2406* (2013.01); *H05H 2001/245* (2013.01)

(58) Field of Classification Search
CPC .......... H05H 1/2406; H05H 2001/245; H05H 2001/2418; H05H 2001/2456; A61L 2/14; B01J 19/088
USPC .......................................................... 204/165
See application file for complete search history.

(56) References Cited

U.S. PATENT DOCUMENTS 4,975,579 A * 12/1990 Iwanaga ........................ 250/324
7,892,611 B2 2/2011 Swallow et al.

(Continued)

FOREIGN PATENT DOCUMENTS

CN 1784519 A 6/2006
JP H0665739 3/1994

(Continued)

OTHER PUBLICATIONS

Maksimov et al "Electrolyte-as-cathode glow discharge emission and the processes of solution-to-plasma transport of neutral and charged species", High Engergy Chemistry, vol. 38, p. 196=199, 2004.*

(Continued)

*Primary Examiner* — Xiuyu Tai

(74) *Attorney, Agent, or Firm* — Fleit Gibbons Gutman Bongini & Bianco PL; Martin Fleit; Paul D. Bianco

(57) ABSTRACT

The invention relates to a surface dielectric barrier discharge plasma unit. The unit comprises a solid dielectric structure provided with an interior space wherein an interior electrode is arranged. Further, the unit comprises a further electrode for generating in concert with the interior electrode a surface dielectric barrier discharge plasma. The unit is also provided with a gas flow path along a surface of the structure.

17 Claims, 20 Drawing Sheets

(56) References Cited

U.S. PATENT DOCUMENTS

| | | | | |
|---|---|---|---|---|
| 2005/0016456 | A1 | 1/2005 | Taguchi et al. | |
| 2005/0118079 | A1* | 6/2005 | Muroi et al. | 422/186.3 |
| 2006/0042545 | A1* | 3/2006 | Shibata et al. | 118/722 |
| 2006/0162741 | A1 | 7/2006 | Kurunczi | |
| 2006/0196424 | A1 | 9/2006 | Swallow et al. | |
| 2006/0272673 | A1 | 12/2006 | Kurunczi | |
| 2011/0006039 | A1 | 1/2011 | Swallow et al. | |

FOREIGN PATENT DOCUMENTS

| | | |
|---|---|---|
| JP | 2005515843 | 6/2005 |
| JP | 2006515708 | 6/2006 |
| JP | 2006515708 A | 6/2006 |
| JP | 2006244835 | 9/2006 |
| WO | 03063914 | 8/2003 |
| WO | 03071839 | 8/2003 |
| WO | 2004068916 | 8/2004 |
| WO | 2006103945 | 10/2006 |

OTHER PUBLICATIONS

International Search Report published Jul. 10, 2008 for PCT/NL2007/050707 filed Dec. 28, 2007.

International Preliminary Report on Patentability published Jun. 30, 2009, for International Application No. PCT/NL2007/050707, filed Dec. 28, 2007.

Written Opinion published on Jun. 28, 2009, for International Application No. PCT/NL2007/050707, filed Dec. 28, 2007.

English translation of Japanese Office Action mailed Nov. 26, 2013 for Japanese Patent Application No. 2009-543973.

Notification of The First Office Action of application No. 2042103824396 published Jun. 5, 2014.

"Electrolyte-as-Cathode Glow Discharge Emission and the Processes of Solution-to-Plasma Transport of Neutral and Charged Species", A. I. Maksimov et al., High Energy Chemistry, vol. 38, No. 3, 2004, pp. 196-199.

* cited by examiner

SURFACE DIELECTRIC BARRIER DISCHARGE PLASMA UNIT AND A METHOD OF GENERATING A SURFACE PLASMA

FIELD OF THE INVENTION

The invention relates to a surface dielectric barrier discharge plasma unit comprising a solid dielectric structure provided with an interior space wherein an interior electrode is arranged, further comprising a further electrode for generating in concert with the interior electrode a surface dielectric barrier discharge plasma, wherein the plasma unit is further provided with a gas flow path along a surface of the structure.

BACKGROUND OF THE INVENTION

Solid dielectric structures having electrode structures arranged on or embedded in the dielectric structures are known for performing plasma processes. A first electrode is positioned on a treating surface of the structure, while a second electrode is placed on the opposite side of the dielectric structure. In such a process, gas flows needed for the plasma process can be induced along a treating surface of the structure.

Dedicated plasma units having an interior electrode are also known. The interior electrode is obtained via a process wherein dielectric material is partially removed for forming a groove in a surface of the dielectric structure, an electrode deposition process and a process wherein the interior electrode is covered with dielectric material to obtain a flat dielectric surface. Again, a second electrode is placed on the opposite side of the dielectric structure. Dedicated plasma units having only interior electrodes are also known. By creating an electric field between pairs of interior electrodes a plasma process can be induced along a treating surface of the structure.

However, plasma treatments appear to be non-uniform, especially when treating structures having low or non-gas permeable materials. The gas flow is flown in a plasma zone between the structure to be treated and a treating surface of the solid dielectric structure and reacts chemically and/or physically with the structure to be treated. As a consequence, less reactive gas particles are available in a desired area that is remote from and downstream to an area where the gas enters the plasma zone, thus resulting in a non-uniform plasma treatment. The composition of the plasma activated gas is changed during its passage along the treating structure. As a result the concentration of gaseous precursor gases or particles that are added to the plasma carrier gas, may be too high in the area where the gas enters the plasma zone and too low in the area where the gas leaves the plasma zone. A too high degree of precursor decomposition may result in unwanted precursor fragments that eventually cause decreased layer quality or undesirable dust by gas phase polymerization. As partial compensation of the change of precursor gas composition along the flow path in the plasma zone, generally a high gas flow rate is being applied resulting in a significant loss of unreacted precursor gas leaving the plasma zone.

SUMMARY OF THE INVENTION

It is an object of the invention to provide a surface dielectric barrier discharge plasma unit according to the preamble, wherein the disadvantage identified above is reduced. In particular, the invention aims at obtaining a surface dielectric barrier discharge plasma unit according to the preamble enabling a more uniform and more efficient plasma treatment. Thereto, according to the invention, the gas flow path is oriented substantially transverse with respect to a treating surface of the solid dielectric structure.

By orienting the gas flow path substantially transverse with respect to a treating surface of the structure, e.g. through or along a side surface of the solid dielectric structure, a desired plasma treating area near the treating surface of the structure can be reached directly by the gas flow. Accordingly, a gas flow path section upstream to the desired area but located in a plasma zone is reduced and the gas can be provided more evenly in the entire plasma region, so that a more uniform plasma process is enabled. Further, the gas particles are processed more efficiently.

It is noted that the invention is partly based on the insight that a combination of an interior electrode and a further electrode can be used to counteract a surface plasma along the gas flow path section substantially transversely with respect to the treating surface of the solid dielectric surface, thereby enabling an efficient plasma process near the treating surface of the structure counteracting a plasma process with the gas particles before they reach the structure to be treated.

Moreover, by the apparatus according to the invention, the apparatus can be scaled up to larger plasma zones, thereby improving a production volume.

Further, by orienting the gas flow path substantially transverse with respect to the treating surface of the structure, the solid dielectric structure can be cooled efficiently by the gas flow, e.g. by flowing the gas along side surfaces of the structure or walls of the structure defining openings through which the gas can flow towards the plasma zone.

Preferably, the interior electrode is implemented as an electrolyte, the electrolyte further serving as a temperature conditioning fluid, e.g. for efficiently cooling or heating the solid dielectric structure. In this way, conflicting requirements with respect to electrical isolation and heating guiding properties of the solid dielectric structure are elegantly circumvented. However, the electrolyte can also merely serve as interior electrode, e.g. if the temperature of the solid dielectric structure is conditioned otherwise.

In an advantageous embodiment according to the invention, the interior space in the solid dielectric structure has been manufactured by an extruding process, thereby enabling an efficient manufacturing method of a plasma unit that can be scaled up relatively easily using standard extruding processes.

The invention relates further to a method of generating a surface dielectric barrier discharge plasma.

Other advantageous embodiments according to the invention are described in the following claims.

BRIEF DESCRIPTION OF THE DRAWINGS

By way of example only, embodiments of the present invention will now be described with reference to the accompanying figures in which.

DETAILED DESCRIPTION OF THE INVENTION

It is noted that the figures show merely preferred embodiments according to the invention. In the figures, the same reference numbers refer to equal or corresponding parts.

Figure 1:
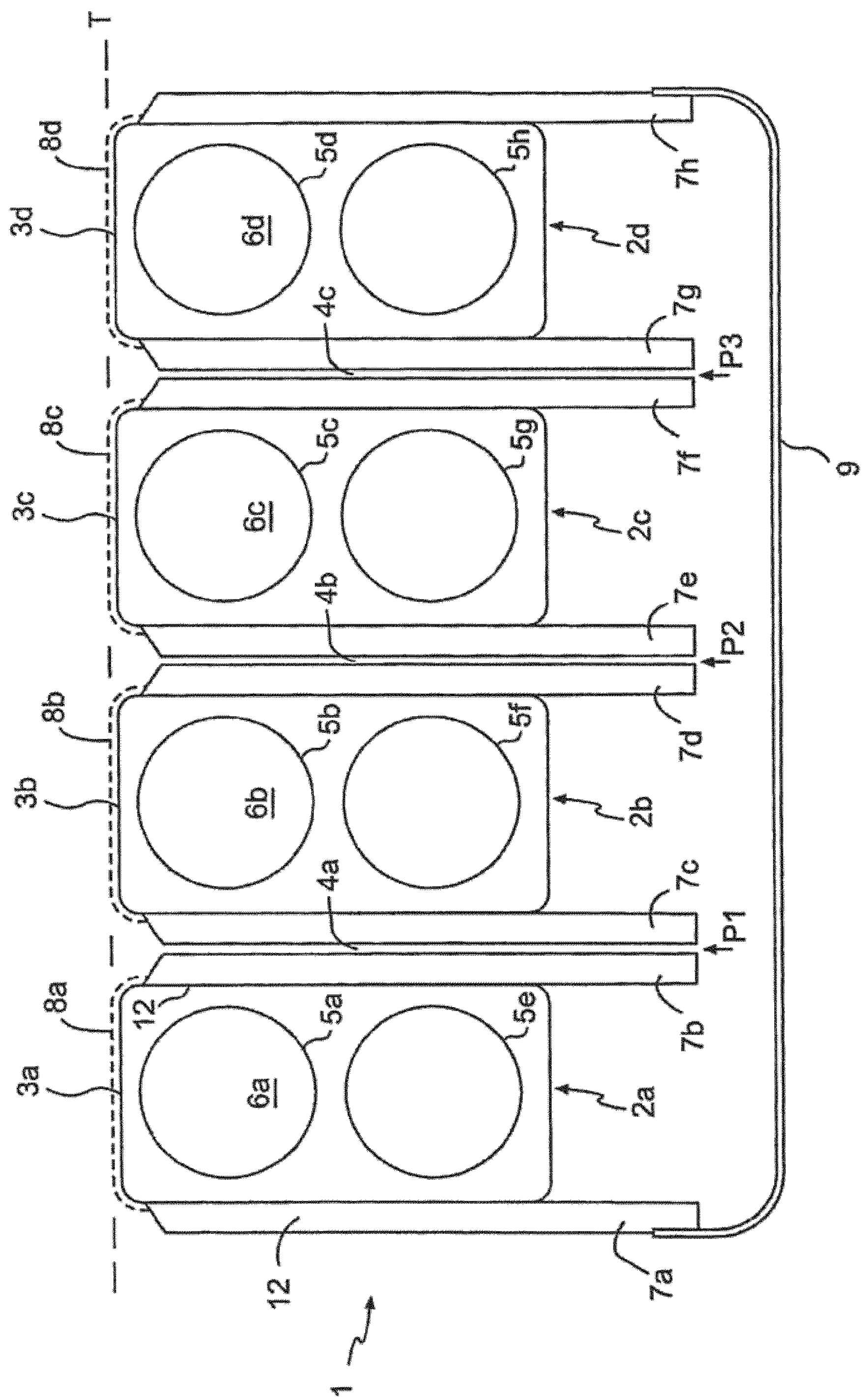
FIG. 1 shows a schematic cross sectional view of a first embodiment of a surface dielectric barrier discharge plasma unit according to the invention.

FIG. 1 shows a schematic cross sectional view of a first embodiment of a surface dielectric barrier discharge plasma unit 1 according to the invention. The unit 1 comprises an assembly of a multiple number of elongated shaped solid dielectric structure elements 2*a*, 2*b*, 2*c*, 2*d*. The elements 2*a*, 2*b*, 2*c*, 2*d* may be substantially arranged in parallel forming a solid dielectric structure such that an exterior treating surface 3*a*, 3*b*, 3*c*, 3*d* of each solid dielectric structure element 2*a*, 2*b*, 2*c*, 2*d* substantially extends in a common treating plane T. Alternatively, the elements 2*a*, 2*b*, 2*c*, 2*d* may be arranged so than respective exterior side surfaces of said elements are not exactly parallel to each other. This embodiment will be discussed in further detail with reference to FIG. 11. Further, inter spaces 4*a*, 4*b*, 4*c* between adjacent solid dielectric structure elements 2*a*, 2*b*, 2*c*, 2*d* define at least a part of gas flow paths P1, P2, P3 that extends along a surface of the solid dielectric structure elements 2*a*, 2*b*, 2*c*, 2*d*. The gas flow paths can have further sections as described below.

Each solid dielectric structure element 2*a*, 2*b*, 2*c*, 2*d* is provided with an upper interior space 5*a*, 5*b*, 5*c*, 5*d* wherein an interior electrode 6*a*, 6*b*, 6*c*, 6*d* is arranged. Further, each solid dielectric structure element 2*a*, 2*b*, 2*c*, 2*d* comprises further, exterior electrodes 7*a*, 7*b*, 7*c*, 7*d*, 7*e*, 7*f*, 7*g*, 7*h* arranged adjacent to an exterior surface of the solid dielectric structure. During operation of the surface dielectric barrier discharge plasma unit 1 voltage differences are applied between exterior electrodes 7*a*, 7*b*, 7*c*, 7*d*, 7*e*, 7*f*, 7*g*, 7*h* and interior electrodes 6*a*, 6*b*, 6*c*, 6*d* for generating a surface dielectric barrier discharge plasma 8*a*, 8*b*, 8*c*, 8*d*. Thus, at exterior surfaces of the solid dielectric structure elements 2*a*, 2*b*, 2*c*, 2*d* the exterior electrodes generate in concert with the interior electrodes 6*a*, 6*b*, 6*c*, 6*d* the plasmas 8*a*, 8*b*, 8*c*, 8*d*.

The surface dielectric barrier discharge plasma unit 1 according to the invention is arranged for operating at high gas pressures, e.g. at a gas pressures in the range 0, 1-1 bar or significantly higher than atmospheric pressure, thereby enabling the treatment of a large gas volume and/or a large surface area.

During operation of the unit 1 a structure to be treated is present substantially in the treating plane T. By generating the plasma and by flowing gas to the treating plane T via the gas flow paths P1, P2, P3 the structure to be treated is subjected to a specific plasma process, e.g. for surface activation, improvement of adhesion, dyability and printability, deposition by plasma-grafting, deposition by plasma polymerization and chemical bonding of particles to the structure to be treated. In this manner, physical and/or chemical characteristics of a structure can be modified. It is noted that the structure to be treated can be placed in the treating plane T for performing a batch process. Otherwise, the structure to be treated can be moved along the treating plane T, either substantially continuously, or intermittently. By providing the multiple gas flow paths P1, P2, P3 gas particles can flow through the inter spaces 4 to the treating surfaces 3*a*, 3*b*, 3*c*, 3*d* at different locations, thereby rendering the plasma process more uniform and efficient. By providing an assembly of a multiple number of elongated shaped solid dielectric structure elements 2*a*, 2*b*, 2*c*, 2*d* substantially arranged in parallel forming a solid dielectric structure such that an exterior treating surface 3*a*, 3*b*, 3*c*, 3*d* of each solid dielectric structure substantially extends in a common treating plane T and by providing inter spaces 4*a*, 4*b*, 4*c* between adjacent solid dielectric structures, the thus defined gas flow paths P1, P2, P3 reaches the treating plane T at a multiple number of locations, so that the plasma process is performed even more uniformly. As a result, the plasma treating process is advantageously also performed more uniformly, thereby improving the treatment results and optionally reducing energy and chemical precursor gases that are needed for performing the plasma treatment.

By providing elongated shaped solid dielectric structure elements 2*a*, 2*b*, 2*c*, 2*d* a relatively large treating surface 3*a*, 3*b*, 3*c*, 3*d* is obtained. The dielectric structure elements 2*a*, 2*b*, 2*c*, 2*d* have an elongated shape in a direction substantially transverse with respect to the cross sectional plane of FIG. 1. At least parts of the gas flow paths P1, P2, P3 run along exterior side surfaces 12 of the solid dielectric structure elements 2, the side surfaces 12 extending from the exterior treating surface 3.

Alternatively, also other, non-elongated shapes can be applied, e.g. substantially cubic shaped dielectric structures.

The gas flow paths P1, P2, P3 running along the exterior side surfaces 12 are oriented substantially transverse with respect to the treating plane T wherein a structure to be treated by the unit 1 extends during operation of the unit 1. Similarly, the gas flow paths P1, P2, P3 can be oriented substantially transverse with respect to a treating plane T wherein a structure to be treated by the unit 1 is moved in a treating direction along during operation of the unit 1.

Optionally, a part of the interspaces 4*a*, 4*b*, 4*c* can be used to transport treated gas away from the treating surface thereby further improving the uniformity and efficiency of the plasma treatment. In this case the flow direction in a part of gas flow paths P1, P2, P3 is in the opposite direction. This option is particularly important when treating non or low gas permeable surfaces. Optionally, the gas can be re-circulated after filtration and/or cooling.

The inter spaces 4*a*, 4*b*, 4*c* are provided by defining a distance between exterior electrodes 7*a*, 7*b*, 7*c*, 7*d*, 7*e*, 7*f*, 7*g*, 7*h* that are adjacent with respect to each other. The above-mentioned distance can e.g. be defined by providing separate intermediate portions or by providing a non-flat outwardly oriented surface of the exterior electrodes, e.g. in a direction along the gas flow paths P1, P2, P3 and/or in a direction substantially transverse with respect to the cross sectional plane.

The interior electrodes 6*a*, 6*b*, 6*c*, 6*d* are formed by an electrolyte, thus facilitating, apart from the electric functionality, a temperature conditioning means. The solid dielectric structure elements 2*a*, 2*b*, 2*c*, 2*d* can thus be cooled and/or heated. The electrolyte can be formed by a liquid and/or a gas. The conditioning of the plasma activated reactive gas in a specific temperature range can be very beneficial for treatments such as deposition at optimum reaction speed.

Opposite to the treating plane T, the assembly is surrounded by a metal conducting structure 9, such as a metal cap, connected to the two most remote exterior electrodes. Consequently, high electric field values near edges of the exterior electrodes 7 that may lead to undesirable plasma formation in the flown gas in vicinity of those edges, is counteracted.

Optionally, the solid dielectric structure 2 comprises a multiple number of separate interior spaces, facilitating the production of the structure by an extrusion process. At least one of them may serve as a temperature conditioning fluid channel. As shown in FIG. 1, the solid dielectric structure 2 might comprises an upper interior space 5*a*, 5*b*, 5*c*, 5*d* and a lower interior space 5*e*, 5*f*, 5*g*, 5*h*. Thus, a lower interior space can serve as an additional temperature conditioning channel. In general, an interior space in the solid dielectric structure can serve as an electrode and/or a temperature conditioning fluid channel. It is noted here, however, that the structure 2 can also be provided with a single interior space that serves as an electrode and optionally as an temperature conditioning fluid channel.

If a cross section of the solid dielectric structure is not substantially square, it might be advantageous to provide more than one interior space in the structure, thereby balancing internal forces in the structures, so that production by extrusion is facilitated. Unacceptable, possible temperature depending, large stresses that may occur in the material during its manufacturing or application for plasma treatment, are counteracted. An additional interior space can be filled with an electrical isolator, such as a gas, transformer oil or a solid dielectric, such as epoxy. Otherwise, the additional interior space can serve as an electrode. By manipulating the voltage of the electrode in the additional interior space, e.g. by applying a voltage similar to that of exterior electrodes, the location of the surface plasma can in an advantageous way be controlled.

A minimal distance between an exterior surface of the solid dielectric structure on the one hand and a brim of an interior space in the structure is determined by break through characteristics of the structure material and by a desire to electromagnetically couple the interior electrode and exterior (conducting) surface dielectric barrier plasma with a minimal electrical capacitance. This capacitance is a determining factor influencing the power surface density of the plasma [Watt/$m^2$]. In practice, the above-mentioned minimal distance can as an example be chosen between approximately 0.5 mm and approximately 1 mm. However, also other distances can be applied, e.g. 2 mm or more, or 0.3 mm or less.

In the embodiment shown in FIG. 1, the exterior electrodes 7 cover substantially the entire side surfaces 12 of the solid dielectric structure 2 at a location where the exterior electrodes 7, also called corona electrodes or sharp electrodes, and the treating surfaces 3 meet each other, the exterior electrodes 7 comprise a sharp end, thereby providing a well defined triple point between the solid dielectric structure 2, the exterior electrode and the gas induced via the gas flow paths. Since the exterior electrodes are positioned outside the treating plane T, a thickness of the exterior electrode can be chosen relatively large compared with a situation wherein the exterior electrodes are positioned at the treating surface 3 of the solid dielectric structure 2. Further, wear of the electrodes e.g. due to friction forces exerted by materials of the structure to be treated is avoided by the arranging the exterior electrodes 7 at side surfaces. Further, erosion or corrosion of the exterior electrodes 7 can be suppressed by using relatively thick metal strips and by effective temperature control. Also, the life time of the exterior electrodes 7 is extended. It is noted that by arranging the exterior electrodes 7 such that they at least partially cover exterior surfaces of the solid dielectric structures 2, cooling of the structures 2 can be performed by the exterior electrodes 7, e.g. by connecting the exterior electrodes 7 to a cooling fin or heat sink. Further, cooling channels can be arranged inside the exterior electrodes 7.

The solid dielectric structure 2 has been manufactured from a suitable dielectric material such as ceramic, e.g. specific types of alumina, glass or glass-ceramic materials. The adhesion between the dielectric material and the exterior electrodes can e.g. be realized by gluing the electrodes, e.g. using an epoxy resin. The gluing material is preferentially either having a high dielectric strength or having high conductivity in order to avoid electric breakdown of this material. The exterior electrode structure may have a U shape in which the solid dielectric structure is inserted. The exterior electrodes can be manufactured from metals such as stainless steel, high carbon steel, platinum or tungsten, coatings or alloys.

Preferably, the interior space 5 in the solid dielectric structure 2 is substantially elongated so that a relatively large treating surface 3 can be provided. Then, the interior space 5 forms a channel.

In an advantageous way, the interior space 5 in the solid dielectric structure 2 has been manufactured by an extruding process, thereby providing a relatively simple, robust and cheap manufacturing method of a plasma unit 1 according to the invention. As a further advantage, relatively long elongated interior spaces can be realized in solid dielectric structures, in particular structures having a single elongated interior space. Thus, up scaling to relatively large elements, e.g. having a length of several meters is possible. By applying an extruding process, a one piece solid dielectric structure 2 can be obtained. Alternatively, when non-elongated solid dielectric structures are required, the interior space can be manufactured by another process e.g. milling.

The exterior electrodes 7 are in direct contact with the solid dielectric structure 2, so that the electric field is not merely dependent on the sharpness of the exterior electrodes, but is further enhanced by the permittivity difference between the gas and the solid dielectric structure 2.

Scaling up electrodes for surface dielectric barrier plasma treatment may cause a relatively high electrical capacitive load. In an advantageous way, the electrical power delivered to each solid dielectric barrier structure is supplied by an individual power supply unit via its inner electrode 6 and the exterior electrode 7. Above a specific length (typically 1-4 m) of the elongated dielectric barrier structures, the use of a separate power supply for each of those structures is beneficial for process control. Alternatively, from the total number of exterior electrodes 7 being part of a plasma treating unit, groups of electrodes may be connected to separate power supplies. As a second alternative, the exterior electrodes 7 of a single dielectric structure may be divided in segments where each segment receives electrical power from a separate power supply. The reduction of the electrical capacitance per power supply may be used to operate the surface barrier discharge when applying an alternating voltage potential between the electrodes at high frequency and/or with repetitive sharp rising pulses. The application of such pulses may result in a more uniform distribution of surface barrier discharge filaments along the treating surface. Further, the costs of a modular power supply system can be reduced by using cheaper components.

Figure 2:
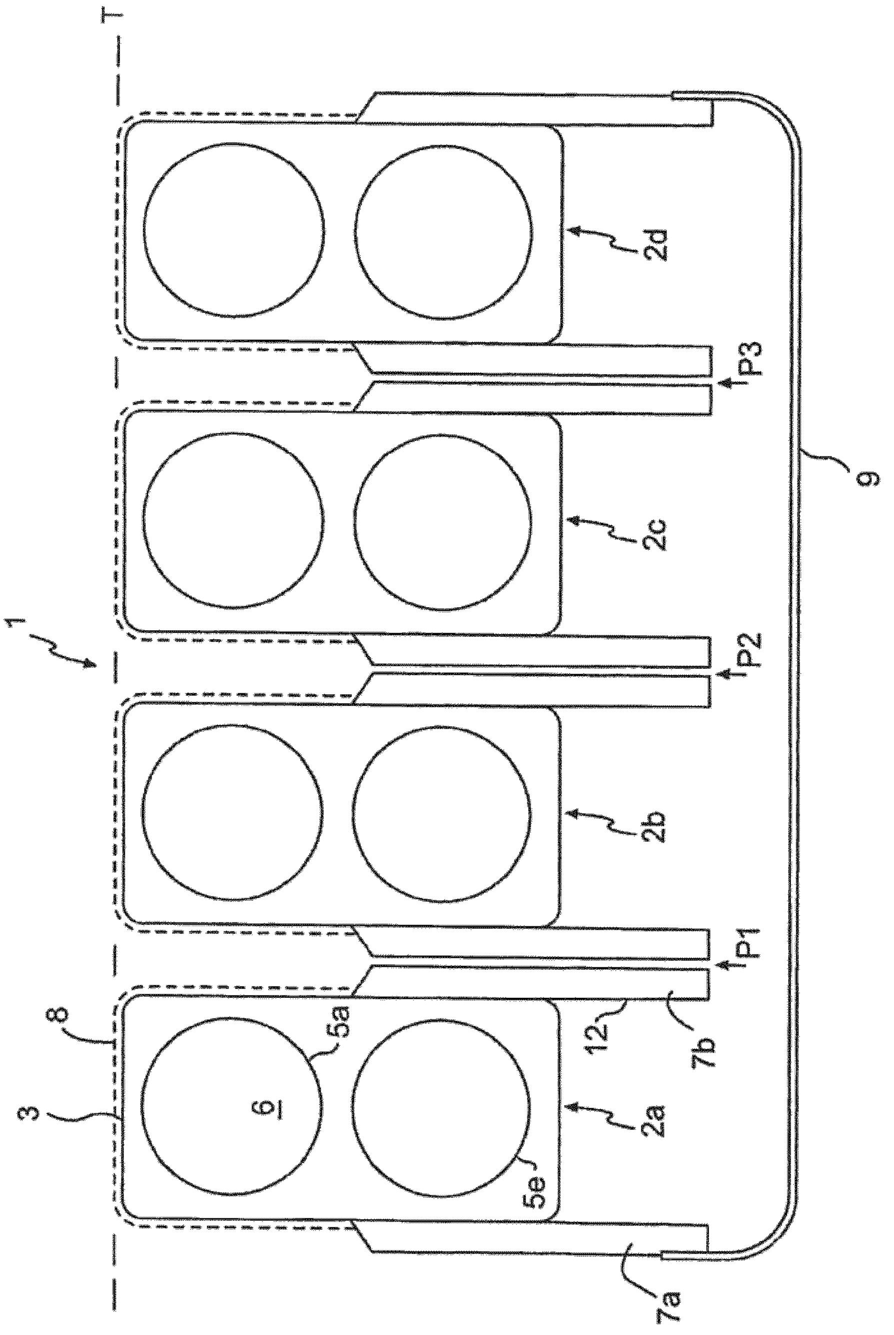
FIG. 2 shows a schematic cross sectional view of a second embodiment of a surface dielectric barrier discharge plasma unit according to the invention.

FIG. 2 shows a schematic cross sectional view of a second embodiment of a surface dielectric barrier discharge plasma unit 1 according to the invention. The exterior electrodes 7 partially cover exterior side surfaces 12 of the solid dielectric structure 2, thereby leaving upper sections of the exterior side surfaces uncovered. As a consequence, the region where the surface plasma is induced extends from the exterior treating surfaces 3 to the uncovered upper sections of the exterior side surfaces 12. The embodiment shown in FIG. 2 allows for the treatment of a surface by means of plasma activated gas, i.e. the flow of gas via the gas flow paths P1, P2, P3 between the exterior electrodes 7, in combination with a, possibly other, gas that is fed along the treatment plane T of the unit 1. This type of so-called plasma jet is effective in case of high gas velocity since there is a short time between production of reactive particles in the plasma and their transport to the surface of a structure at a short distance. In particular applications the partial decomposition (scissoring) of a precursor gas before deposition may be desirable. In specific applications polymerization of a precursor gas, thereby forming submicron sized particles, is achieved before their deposition at the surface of the structure. In particular applications it may be preferred to use different gases along gas flow paths P1, P2 and P3, e.g. for surface activation, layer or particle deposition and curing or further cross-linking of this polymer layer.

Figure 3:
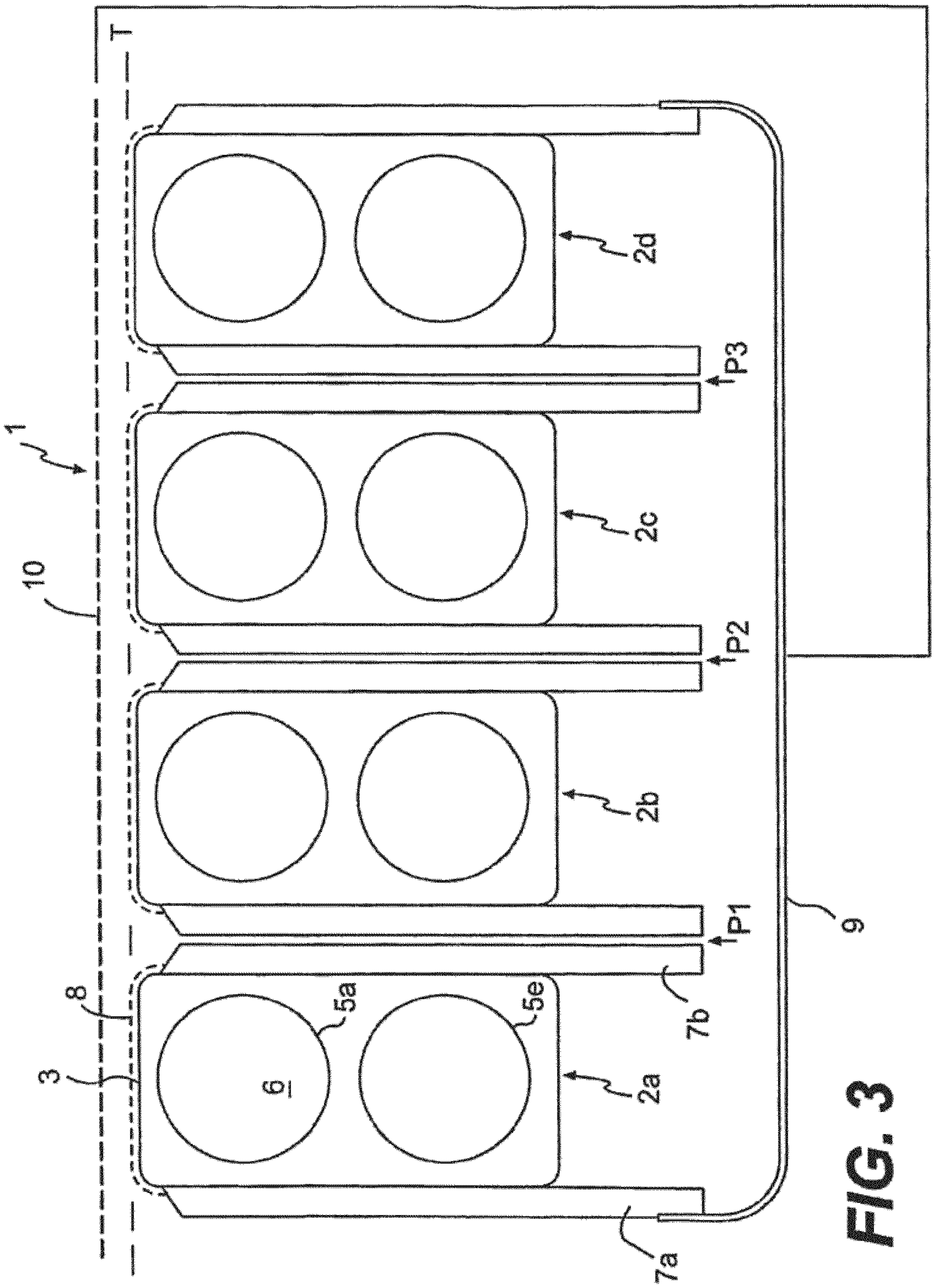
FIG. 3 shows a schematic cross sectional view of a third embodiment of a surface dielectric barrier discharge plasma unit according to the invention.

FIG. 3 shows a schematic cross sectional view of a third embodiment of a surface dielectric barrier discharge plasma unit 1 according to the invention. The unit 1 comprises an electrically conducting, earthed and perforated plate 10 extending at least partially along an exterior treating surface 3 of the solid dielectric structure 2. By providing the perforated plate 10 the distribution of the plasma activated gas is further improved. In this case it is preferred to apply a high gas speed, in order to limit loss of plasma reactivity by collisions between the reactive gas particles and between gas particles and the perforated plate before reaching the structure to be treated downstream. Further, a safer situation is obtained since the plate 10 is earthed. This option is advantageous when objects are treated in a space that is accessible for a person employing the plasma unit, e.g. for sterilization or disinfection purposes, such as floors, furniture, instruments or human skin.

Figure 4A:
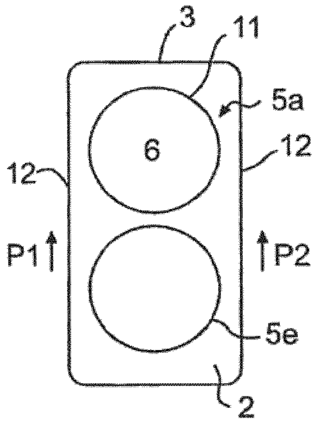
FIG. 4*a* shows a schematic cross sectional view of a first solid dielectric structure.

FIG. 4*a* shows a schematic cross sectional view of a first solid dielectric structure 2 having an upper interior space 5*a* and a lower interior space 5*e*. The upper interior space 5*a* comprises a wall 11, e.g. implemented as an electrically conducting coating, foil or a tube. The space interior to the wall 11 is filled with a fluid, viz. a liquid or a gas 6 for conditioning the temperature of the solid dielectric structure 2. By providing an electrically conducting wall 11 the temperature conditioning fluid enclosed by an electrical conductor is thus shielded from electromagnetic fields, thereby rendering any material composition more stable over time. Gas flow paths P1, P2 extends along side walls 12, the walls 12 extending from the treating surface 3.

Figure 4B:
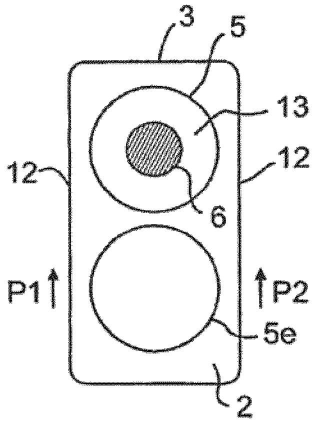
FIG. 4*b* shows a schematic cross sectional view of a second solid dielectric structure.

FIG. 4*b* shows a schematic cross sectional view of a second solid dielectric structure 2 wherein the upper interior space 5*a* comprises a solid electrode 6, preferably centred in the middle of the upper interior space 5*a*. The electrode 6, which can be copper, is surrounded by an electrically conducting, temperature conditioning fluid 13 which can be an aqueous solution of a copper sulphate.

Figure 4C:
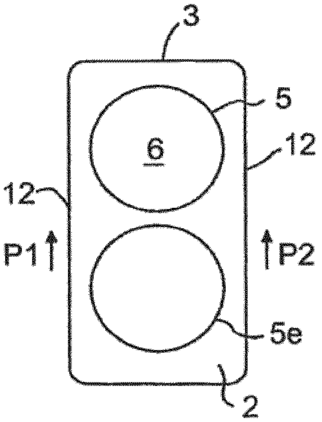
FIG. 4*c* shows a schematic cross sectional view of a third solid dielectric structure.

Further, FIG. 4*c* shows a schematic cross sectional view of a third solid dielectric structure 2 wherein the upper interior space 5*a* is filled with an electrically conducting, temperature conditioning fluid 6. By filling the interior space with an electrically conducting, temperature conditioning fluid, the requirement of gas free contact between the interior electrode and the solid dielectric structure in order to avoid undesirable plasma formation has been fulfilled. Further, using a liquid electrolyte electrode, the problem associated with different temperature dependent expansion coefficients of metal and ceramic has been solved. Further, also the problem of a reduced life time of thin metal coatings due to thermal/chemical degradation has been solved. Moreover, the embodiments of FIGS. 4*b* and 4*c* are superior over the embodiment shown in FIG. 4*a* as inserting a solid metal rod or tube in extruded ceramic channels might be difficult due to unavoidable air inclusion causing localised plasma and resulting in thermal damage, and by because of the presence of small ceramic defects and/or protrusions.

It is noted that a solid dielectric structure 2 as shown in FIGS. 4*a*-*c* can be used for forming an assembly is shown in FIG. 1. However, such a solid dielectric structure 2 can also be used separately. As an example, an elongated single solid dielectric structure 2 as shown in FIGS. 4*a-c* can be used for processing elongated objects, e.g. a plasma treatment of a fibre, a bundle of fibres or yarns. The gas flow paths P1, P2 are bounded by side surfaces 12 of the solid dielectric structure 2. In case of a single solid dielectric structure 2, the gas flow paths P1, P2 may further be bounded by further non-electrically conducting structures arranged adjacent the solid dielectric structure 2.

Preferably an exterior electrode is connected to earth, thereby avoiding unsafe situations. By applying non-zero voltages to interior electrodes, the voltage differential between the interior and exterior electrode generates the surface dielectric barrier discharge plasma. If desired, the voltages can also be applied otherwise, e.g. by earthing the interior electrode and by applying the non-zero voltage to the exterior electrode.

Figure 5:
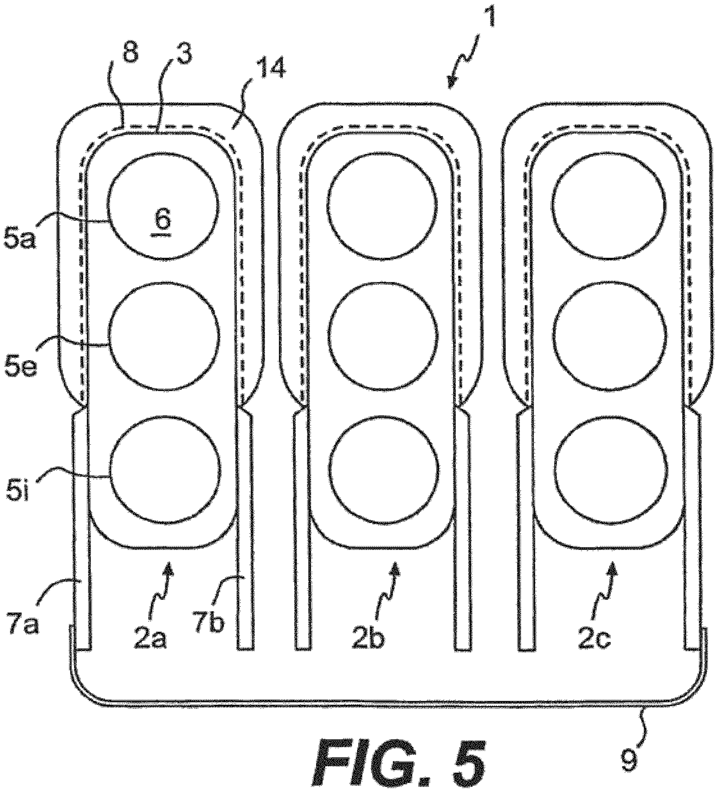
FIG. 5 shows a schematic cross sectional side view of a fourth embodiment of a surface dielectric barrier discharge plasma unit according to the invention.
Figure 6A:
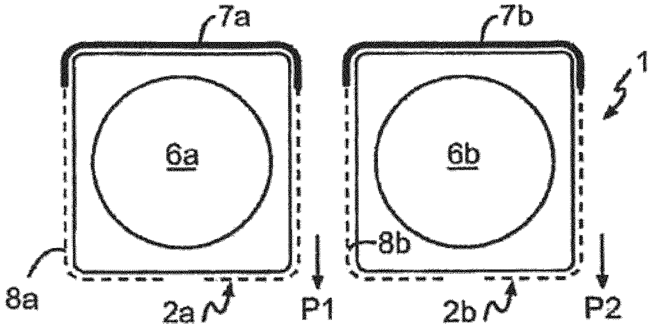
FIG. 6*a* shows a schematic cross sectional view of a fifth embodiment of a surface dielectric barrier discharge plasma unit according to the invention.
Figure 6B:
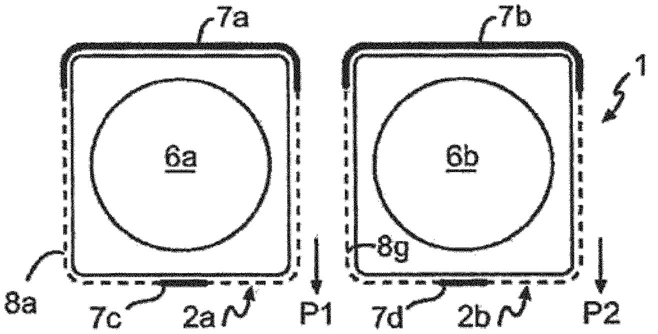
FIG. 6*b* shows a schematic cross sectional view of a sixth embodiment of a surface dielectric barrier discharge plasma unit according to the invention.
Figure 6C:
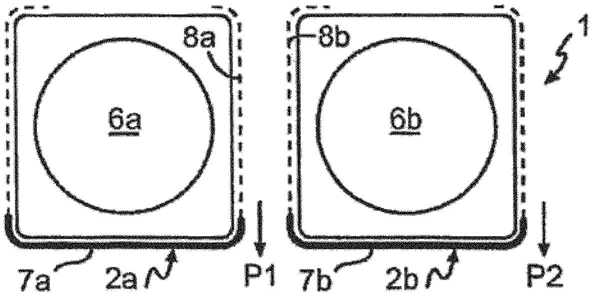
FIG. 6*c* shows a schematic cross sectional view of a seventh embodiment of a surface dielectric barrier discharge plasma unit according to the invention.
Figure 6D:
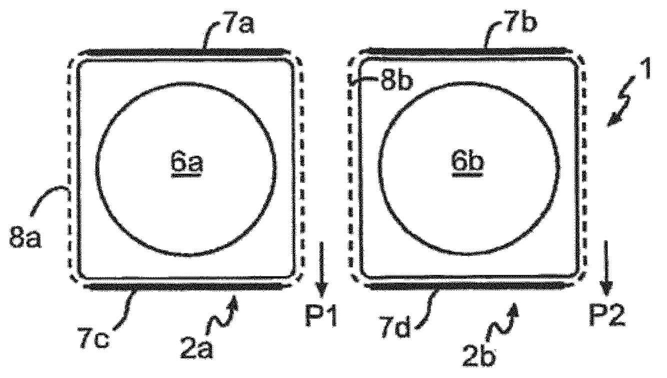
FIG. 6*d* shows a schematic cross sectional view of a eighth embodiment of a surface dielectric barrier discharge plasma unit according to the invention.
Figure 6E:
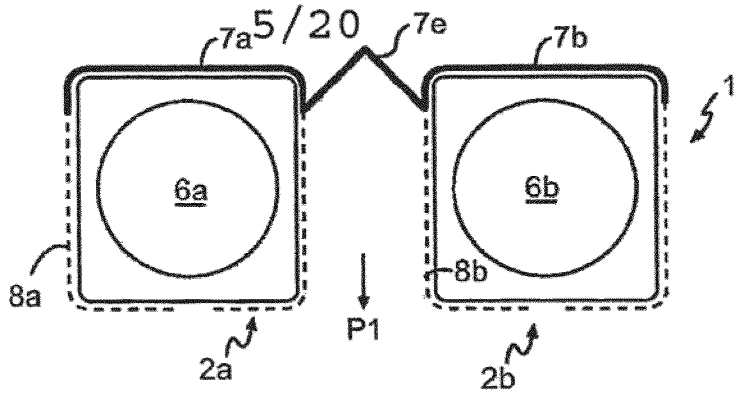
FIG. 6*e* shows a schematic cross sectional view of a ninth embodiment of a surface dielectric barrier discharge plasma unit according to the invention.

FIG. 5 shows a schematic cross sectional side view of a fourth embodiment of a surface dielectric barrier discharge plasma unit 1 according to the invention. Here, an exterior treating surface 3 of the solid dielectric structure 2 is covered by a porous, electrically isolating layer 14. Further, an individual solid dielectric structure 2 comprises three inner spaces 5*a*, 5*e*, 5*i*. By applying the porous, electrically isolating layer 14 a plasma unit 1 is obtained that is suitable for treating of a gas. Examples are removal of volatile organic compounds such as industrial solvents, hydrocarbons, CO, NOx, SO2, H2S, soot, dust and micro-organisms, e.g. in combustion gases, fuel conversion systems (e.g. fuel or biomass to hydrogen), air conditioning applications, air supply systems for large buildings, hospitals, military compounds etc. Preferably, the porous layer 14 comprises gas adsorbing materials e.g. porous alumina, zeolites for adsorbing gaseous pollutants and catalytic materials e.g. MnOx, Au/TiO2, for plasma-assisted chemical conversion. By cooling the channels, gas pollutants can be absorbed in the porous layer 14. During operation of the unit 1, the surface plasma 8 can be switched on and off periodically. In a plasma active period, pollutants are oxidized by means of plasma produced chemical species in the porous layer 14, mainly oxidative compounds such as O, $O_3$, $HO_2$, $H_2O_2$. Due to a temperature increase, a part of the adsorbed species may be desorbed and oxidized in plasma activated gas downstream of the unit 1. In a practical embodiment, an upper inner space 5*a* and a middle inner space 5*e* comprises electrodes while a lower inner space 5*i* comprises an isolator or an electrode having substantially the same potential as the exterior electrodes 7.

FIGS. 6*a-e* shows a schematic cross sectional view of a fifth to a ninth embodiment, respectively of a surface dielectric barrier discharge plasma unit 1 according to the invention. A pair of solid dielectric structures 2*a*, 2*b* is shown each provided with a single interior space comprising an interior electrode 6*a*, 6*b*. In general, a solid dielectric structure comprising one or more interior spaces can be manufactured easier and in a more robust way when exterior dimensions of the dielectric structure approach elongate shaped structures than plate shaped structures. Therefore, a solid dielectric structure approaching a square shaped form in cross sectional view can be realized in a relatively simple way. Further, the structures 2*a*, 2*b* have different exterior electrode 7 configurations generating surface plasmas 8*a*, 8*b* at different locations along the exterior surface of the solid dielectric structures 2*a*, 2*b*. In particular, exterior electrodes at a first side of the solid structures, at an opposite side of the solid structures, at both sides of the solid structures and connected via a bridge 7*e* are shown.

The injection of plasma activated gas, plasma jet, can be combined with more localised produced plasma in close vicinity of the structure to be treated. Even different gases can be used along the structure to be treated and through the jet. By means of the applied voltages, the plasma can be more or less extended from the jet to the structure to be treated.

In order to avoid plasma occurring on parts of the solid dielectric structure, a corona electrode having a gas permeable, saw tooth structure, can be applied that is combined with a thinner, more flexible and well attached coating that will not erode because it does not carry the main current.

Figure 7:
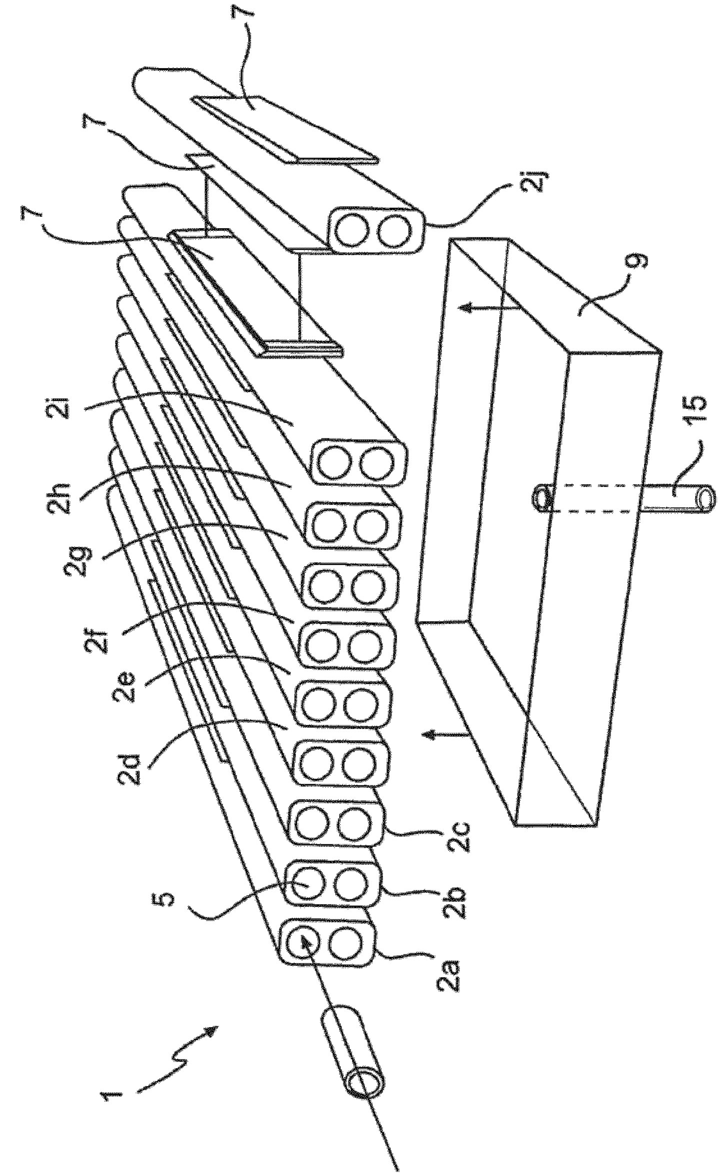
FIG. 7 shows a schematic perspective partially exploded view of the surface dielectric barrier discharge plasma unit of FIG. 1.

FIG. 7 shows a schematic perspective partially exploded view of the surface dielectric barrier discharge plasma unit 1 as shown in FIG. 1. The assembly of solid dielectric structures 2*a*, 2*b*, . . . , 2*j* having interior spaces 5, formed as channels, are positioned adjacent each other with the exterior electrodes 7 placed between them. Metal tubes 11 are pushed into the channels 5 and the entire assembly is placed over the metal cap 9 discussed above. The metal cap is provided with an entry 15 for flowing the gas towards the gas path sections along side surfaces of the solid dielectric structures.

Figure 8:
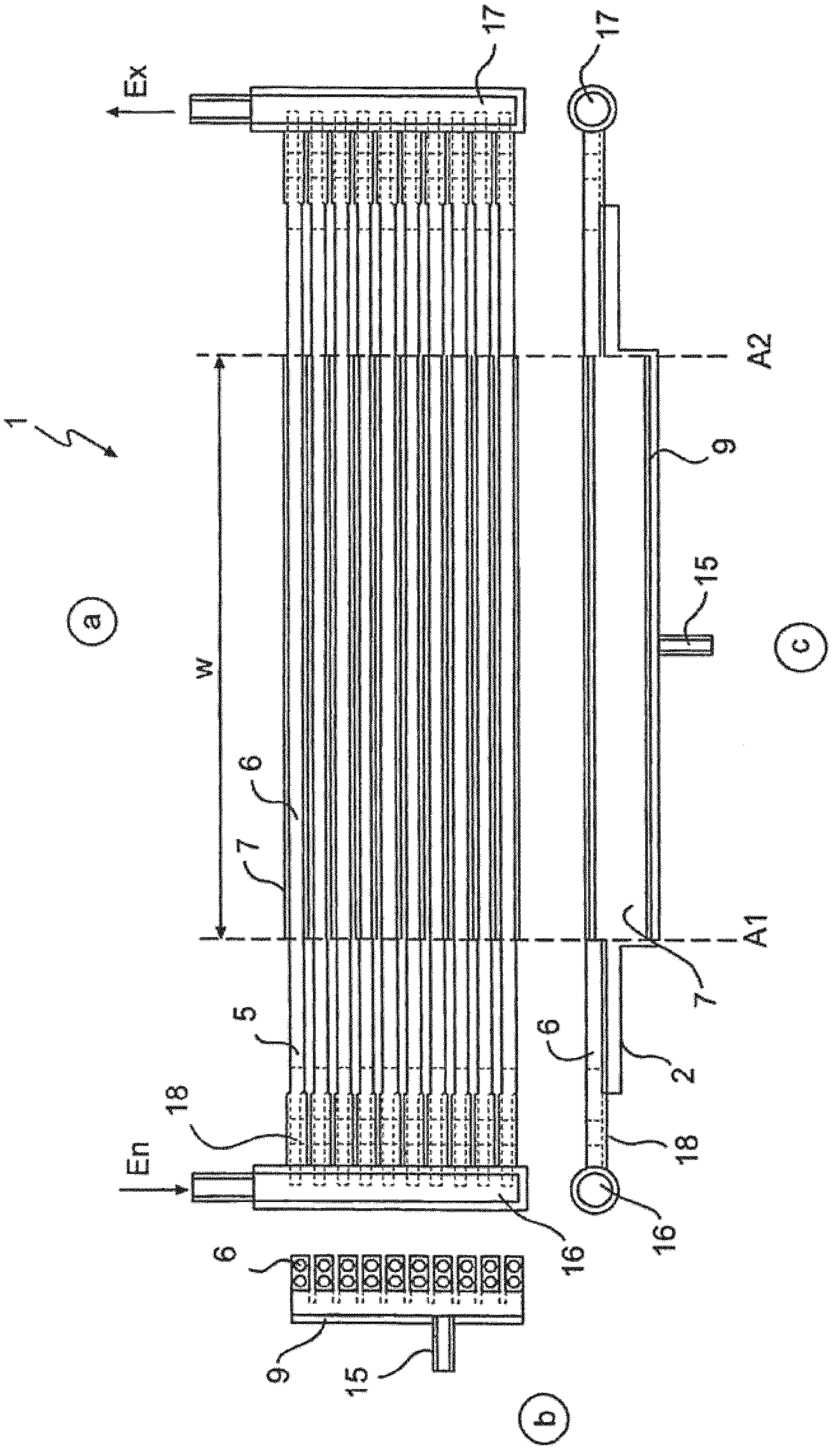
FIG. 8*a* shows a schematic top view of the surface dielectric barrier discharge plasma unit of FIG. 1.
FIG. 8*b* shows a schematic cross sectional side view of the surface dielectric barrier discharge plasma unit of FIG. 8*a;*
FIG. 8*c* shows a further schematic cross sectional side view of the surface dielectric barrier discharge plasma unit of FIG. 8*b;*

FIGS. 8*a*, 8*b*, 8*c* show a schematic top view, cross sectional view and further cross sectional view, respectively, of the surface dielectric barrier discharge plasma unit 1 shown in FIG. 1. Ends of the interior spaces 5 are coupled via a hose connection 18 or another coupling means to an electrolyte inlet channel 16 and electrolyte outlet channel 17, respectively. In this way, the electrolyte 6 serving as temperature conditioning fluid and electrode can flow from an inlet channel entrance En through the solid dielectric structure 2 towards an outlet channel exit Ex. The exterior electrodes 7 extend along distance W between a first plane A1 and a second plane A2 transversely with respect to a longitudinal axis of a interior space 5. Therefore, between the first plane A2 and the second plane A2 a plasma zone is defined.

Figure 9:
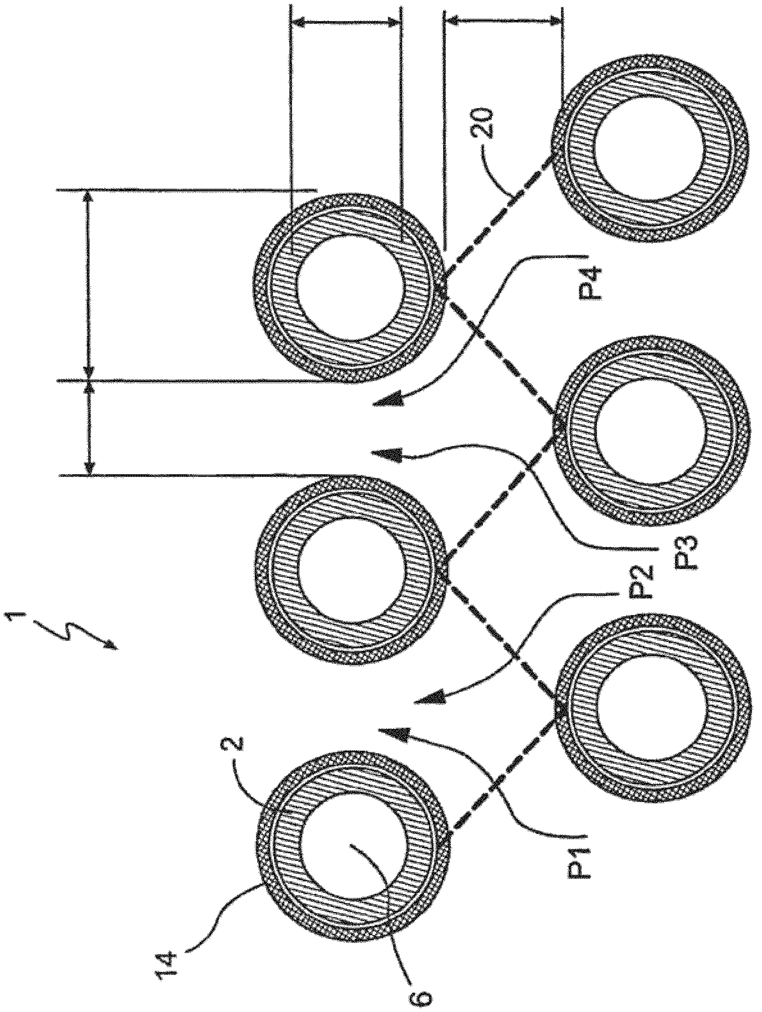
FIG. 9 shows a schematic cross sectional view of a tenth embodiment of a surface dielectric barrier discharge plasma unit according to the invention.

FIG. 9 shows a schematic cross sectional view of a tenth embodiment of a surface dielectric barrier discharge plasma unit 1 according to the invention. The unit 1 comprises a multiple number of solid dielectric structures 2 that are arranged in two shifted rows substantially parallel with respect to each other. The structures are formed as hollow tubes 2 filled with an electrolyte 6. The exterior surface of the tubes 2 is covered with a porous, electrically isolating layer 14, that is preferably gas adsorbent. Optionally, the layer contains catalytic material. The tubes 2 are interconnected via an earthed exterior electrode 20, so that the exterior electrode 20 extends from a remote location into the porous, electrically isolating layer for generating in concert with the interior electrode 6 a surface dielectric barrier discharge plasma. Further, the plasma unit 1 is provided with gas flow paths P1, P2, P3, P4 along exterior surfaces of the tubes 2. The plasma unit 1 can be operated periodically to chemically convert adsorbed gases. Further, the plasma unit 1 can be operated periodically to re-activate catalytic material. In this context, periodically operating the plasma means that the plasma process is discontinuous, interrupted, so that the plasma process is subsequently active and non-active. Alternatively, the plasma process is continuous or quasi continuous to continuously treating a structure to be treated.

Figure 10:
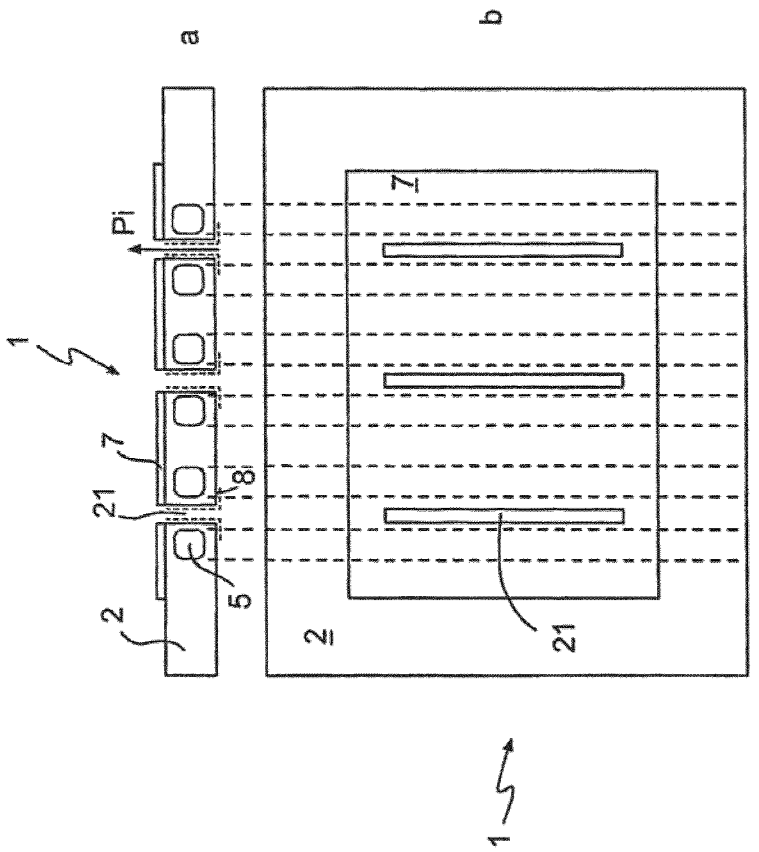
FIG. 10*a* shows a schematic cross sectional view of a eleventh embodiment of a surface dielectric barrier discharge plasma unit according to the invention.
FIG. 10*b* shows a schematic top view of the surface dielectric barrier discharge plasma unit of FIG. 10*a;*

FIGS. 10*a* and 10*b* show a schematic cross sectional view and a schematic top view, respectively, of a eleventh embodiment of a surface dielectric barrier discharge plasma unit 1 according to the invention. In FIG. 10, the solid dielectric structure 2 is substantially plate shaped and the structure is provided with a multiple number of slits 21 through which slits corresponding gas flow paths P1 extend. In principle, it also possible to apply a single slit in the plate shaped structure 2. However, by applying a multiple number of slits the gas can be provided at the structure 2 to be treated in a more uniform way. In FIGS. 10*a* and 10*b*, the unit 1 further comprises a single metal plate 7 serving as an exterior electrode and being located on top of the structure 2. The plate 7 is provided with slits that substantially correspond with the slits 21 of the solid dielectric structure 2. Again, multiple interior spaces 5, formed as channels, are provided in the dielectric structure 2. The channels can e.g. be manufactured by a milling or extrusion process. The channels comprise an interior electrode, implemented as an electrolyte so that the fluid can also serve as a temperature conditioning fluid. By applying an electric voltage between exterior and interior electrodes, a surface plasma 8 is obtained. The surface plasma 8 is formed at the relatively sharp edges of the slits 21 in the metallic plate 7 and many plasma filaments can develop through the slits 21 in the solid dielectric structure 2 to an exterior surface of the structure 2 opposite to the metallic plate 7. The entire surface dielectric barrier discharge plasma unit 1 can be realized as a relatively light weight product. The plate-like solid dielectric structure can be formed integrally or by assembling solid dielectric structure elements, e.g. by joining them together by an epoxy or glass melt.

Thus, a gas flow path that is oriented substantially transverse with respect to a treating surface of the solid dielectric structure can be realized through an opening in the solid dielectric structure, e.g. via a slit in an integral solid dielectric structure or via an inter space between solid dielectric structure elements that are arranged adjacent to each other in an assembly of solid dielectric structure elements forming a solid dielectric structure. Alternatively, the substantially transversely oriented gas flow path can be realized via a space exterior to the solid dielectric structure.

Figure 11:
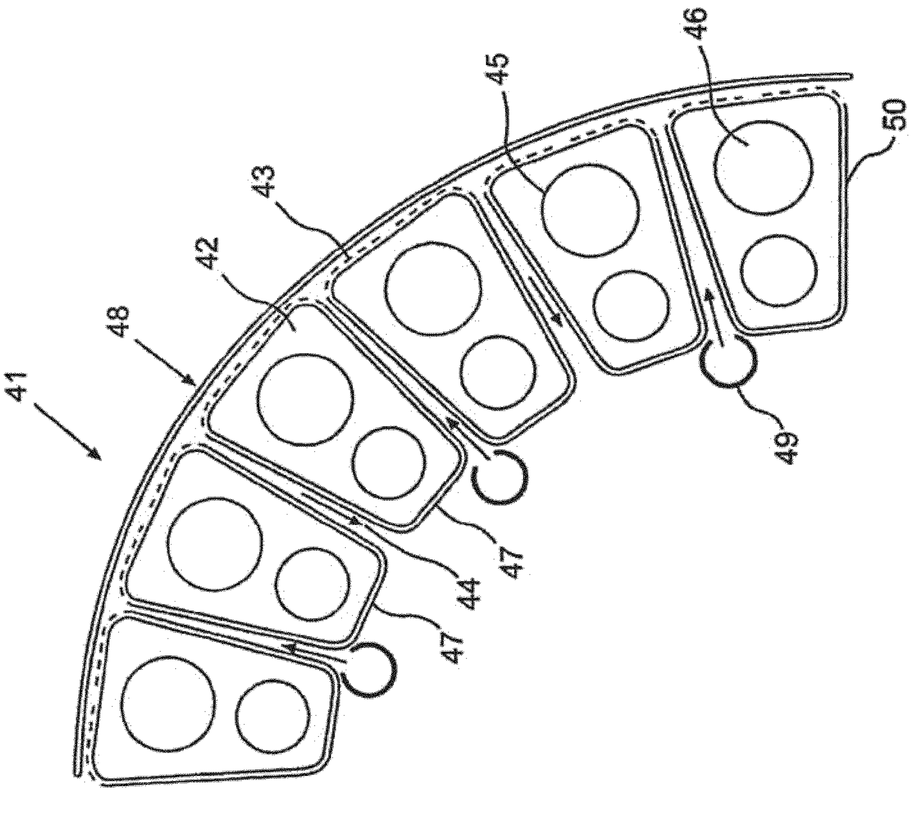
FIG. 11 shows a schematic cross sectional view of a twelfth embodiment of a surface dielectric barrier discharge plasma unit according to the invention.

FIG. 11 shows a schematic cross sectional view of a twelfth embodiment of a surface dielectric barrier discharge plasma unit 41 according to the invention. The solid dielectric structures 42 are substantially arranged in parallel. However, the exterior side surfaces 50 of the structures 42 are not exactly parallel thereby providing a curved treating surface 43 which can be used to treat a flexible external structure 48. Interior spaces 45 are used to provide interior electrodes 46. The flow paths 44 between the exterior electrodes 47 are used to transport gases towards and from the treating surface 43. Gas injection tubes 49 are use to separate gas flows upstream and downstream from the plasma treatment zone. The gas injection tubes 49 may be either electrically insulating or electrically conducting. Conductive gas injection tubes may be used to electrically connect cables from a power supply to exterior electrodes 47.

The embodiment shown in FIG. 11 is particularly suitable for treatment of flexible materials which are transported from roll to roll, such as for example textile, polymeric foil or paper. Therefore a number of solid dielectric barrier structure elements can be arranged to form a cylinder which can be rotated so as to facilitate the continuous treatment of a flexible material.

As an alternative the shape of solid dielectric barrier structure elements can be such that the plasma treating surface 43 is at the inside of a cylindrical unit where it can be applied for the treatment of the external surface of cylinder shaped structures, e.g. tubes or hoses.

In general any flat shaped structure can be treated at both sides by treatment of each side of that surface either simultaneously or in successive steps. The exterior electrodes 47 can be U shaped and connected to the dielectric structures 42 by means of a glue layer with either high dielectric strength or high electrical conductivity. In FIG. 11 the U shaped electrodes covers three sides of the solid dielectric structure.

Figure 12:
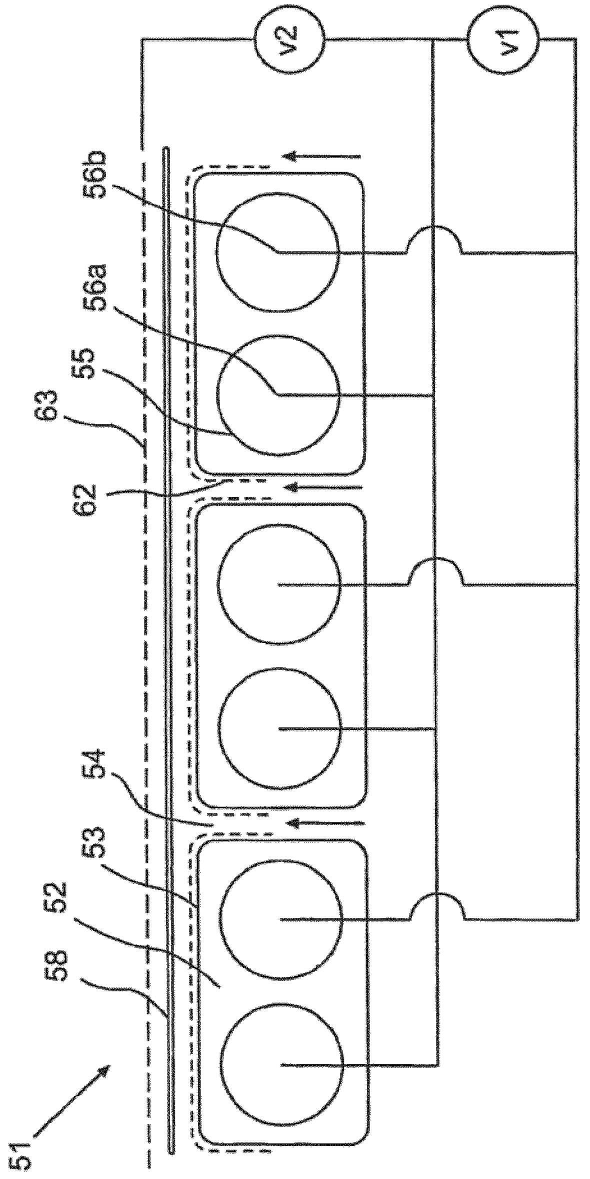
FIG. 12 shows a schematic cross sectional view of a thirteenth embodiment of a surface dielectric barrier discharge plasma unit according to the invention.

FIG. 12 shows a schematic cross sectional view of a thirteenth embodiment of a surface dielectric barrier discharge plasma unit 51 according to the invention. The solid dielectric structures 52, substantially arranged in parallel, have interior spaces 55 each serving as an interior electrode 56. A surface plasma is created along the treating surface 53 by application of an electric field between the interior electrodes 56*a* and 56*b* of each solid dielectric structure, thus without using an exterior electrode structure. By avoidance of an exterior electrode, plasma induced electrode erosion is avoided and the life time of the plasma treating unit is considerably increased. The gas flow paths 4 running along the exterior side surfaces 62 are oriented substantially transverse with respect to the treating plane wherein a structure 58 to be treated by the unit 51 extends.

Alternatively an additional perforated exterior electrode 63 can be placed opposite to the plasma treating surface 53. This option is particular useful for treating a relative thick gas permeable porous structure where the treatment by means of treating surface 53 alone would not be sufficient. By application of an additional electric field between the perforated electrode 63 and the interior electrodes 56*a* and 56*b*, the spatial structure of the surface dielectric barrier plasma can be enlarged from a relatively thin region along the treating surface 53 to a larger volume so as to obtain a deeper penetration of plasma in porous material 58. In order to obtain an adjustable plasma power density and plasma volume, two power sources v1 and v2 may be used and operated at the same frequency but with adjustable amplitudes and/or relative phase shift.

Figure 13:
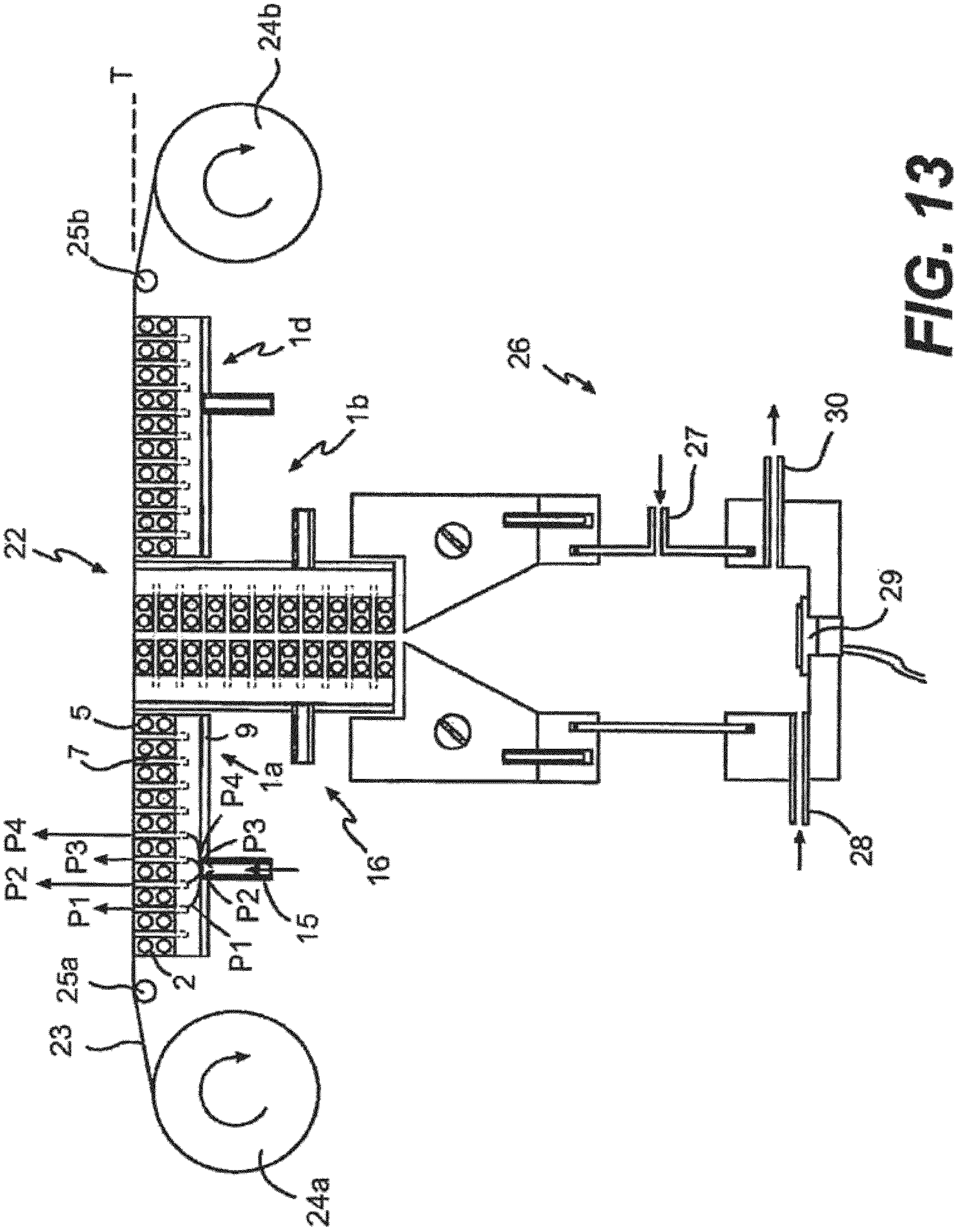
FIG. 13 shows a schematic cross sectional view of a first plasma apparatus.

FIG. 13 shows a schematic cross sectional view of a first plasma apparatus 22. The apparatus comprises four surface dielectric barrier discharge plasma units 1*a*, 1*b*, 1*c*, 1*d* according to an embodiment according to the invention as described above. In particular, the apparatus comprises a primary unit 1*a*, secondary units 1*b*, 1*c* and a tertiary unit 1*d*. As an indicative example of the units 1, a gas and/or a precursor is fed via an inlet 15 in a plasma unit 1*a* to split in a multiple number of gas flow paths P1, P2, P3, P4 along exterior electrodes 7 reaching a treating plane T. By applying voltages between exterior and interior electrodes 7, 5 surface plasmas are generated in the treating plane T, thus processing a structure to be treated 23. Further, the plasma apparatus comprises rollers 24*a*, 24*b* and guiding means 25*a*, 25*b* for guiding the structure to be treated 23 along the plasma units 1*a*, 1*b*, 1*c*, 1*d*, in the treating plane T. The apparatus 22 also comprises a unit 26 for providing an additional gas mixture via an additional gas inlet 27 and/or for providing liquid aerosol particles via a nebuliser 29. The recirculating temperature controlled liquid is provided via inlet 28 and maintained via outlet 30 at a specific level suitable for ultrasonic nebulising.

Figure 14:
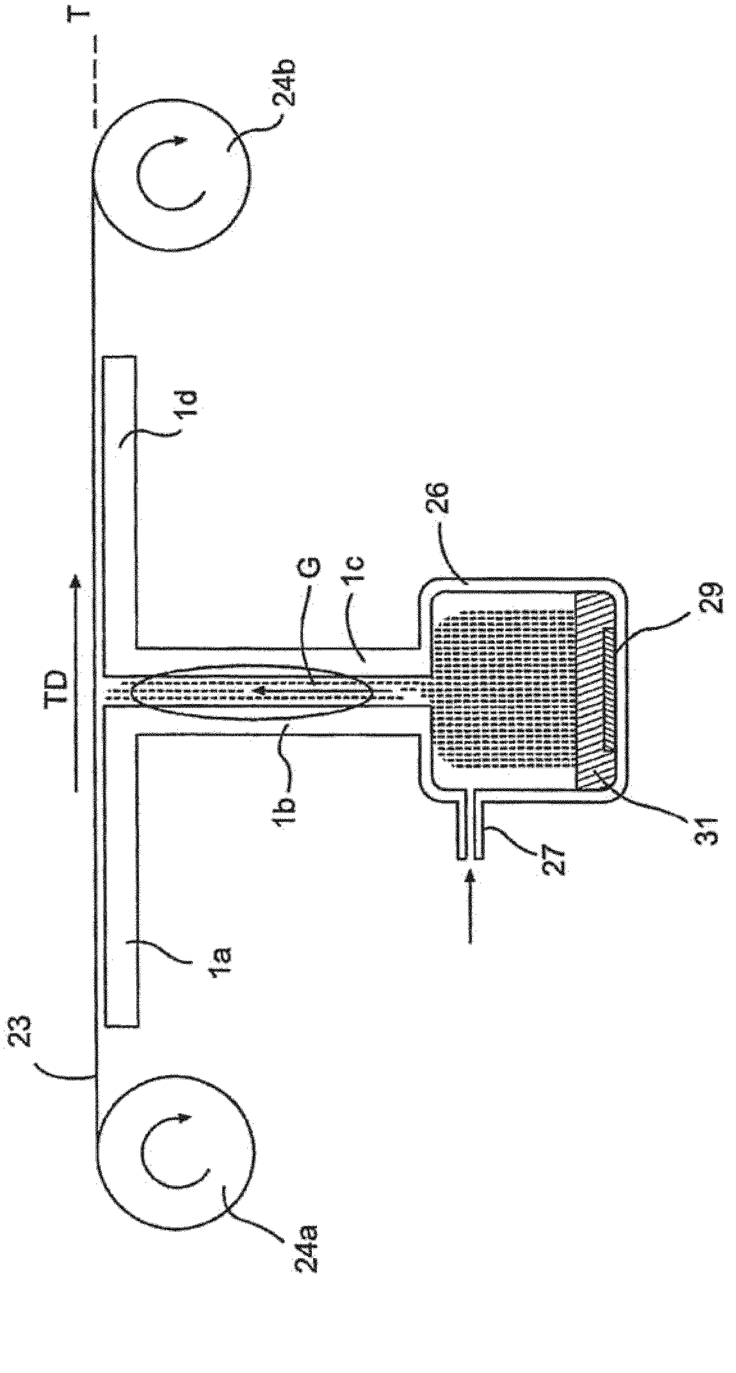
FIG. 14 shows an additional schematic cross sectional view of the plasma apparatus of FIG. 11.

FIG. 14 shows an additional schematic cross sectional view of the plasma apparatus 22 for illustrating the process in some more detail. During operation of the apparatus 22, the structure 23 to be treated is moving along the treating plane T in a treating direction TD. In a first step, the structure passes the first plasma unit 1*a* for a surface discharge plasma pretreatment, followed by a main plasma process via the secondary plasma units 1*b*, 1*c*.

Subsequently, a plasma post treatment is performed by means of the tertiary plasma unit 1*d*. Via a main gas passage way G, also called plasma polymerization zone, between both secondary plasma units 1*b*, 1*c*, a gas is supplied to the treatment plane T. An aerosol containing gas is composed of a gas mixture (e.g. nitrogen-butadiene) fed to the unit 26, and liquid aerosols provided via droplet nebuliser 29. The liquid 31 e.g. styrene, may contain a suspension of solid sub-micron sized particles (e.g. SiO2 particles).

Figure 15:
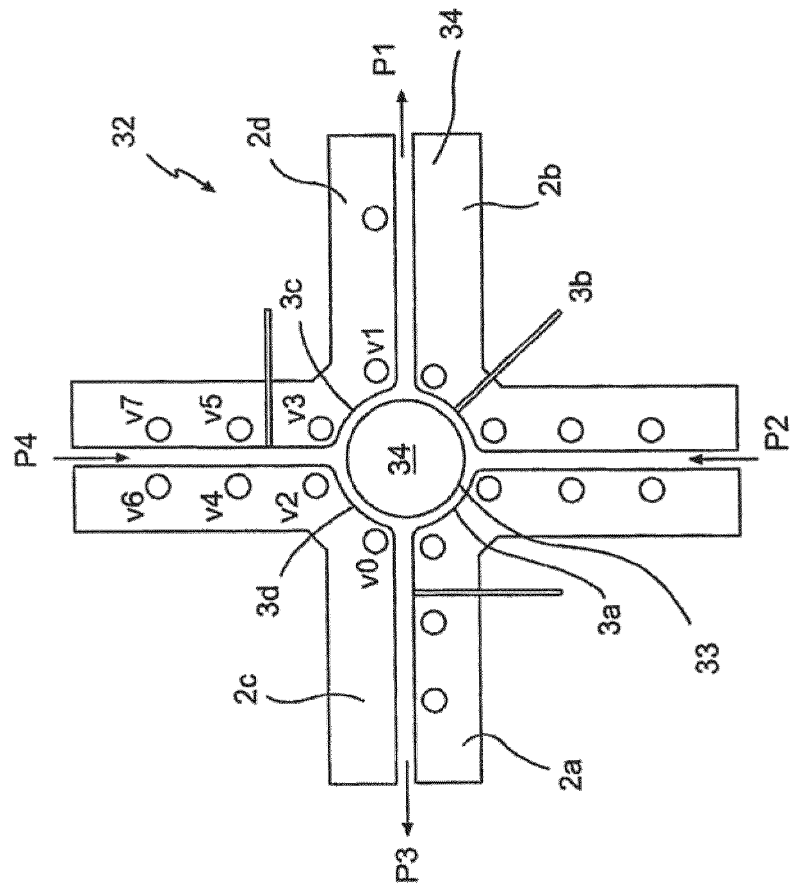
FIG. 15 shows a schematic cross sectional view of a second plasma apparatus.

FIG. 15 shows a schematic cross sectional view of a second plasma apparatus 32 comprising an assembly of a multiple number of solid dielectric structures 2*a*, 2*b*, 2*c*, 2*d*. Treating surfaces 3*a*, 3*b*, 3*c*, 3*d* of the solid dielectric structures surround a treating volume 33. Further, the treating surfaces are curved so as to surround the treating volume 33. The solid dielectric structures comprise exterior side portions 34 extending from the treating surfaces 3 away from the treating volume 33 to enable a more or less homogeneous treatment and effective temperature conditioning. An inter space between exterior side surfaces of two adjacent solid dielectric structures defines at least partially gas flow paths P1, P2,P3, P4. During operation of the plasma apparatus 32 gas flows via the gas flow paths towards and from the treating volume 33. In the treating volume 33 a structure to be treated is positioned, preferably a structure having an exterior periphery substantially coinciding with the shape of the treating surfaces 3 of the dielectric structures 2. Optionally, the gas flow induce a pressure for keeping the structure to be treated in a desired position in the treating volume 33, e.g. in the centre of the treating volume 33 to avoid friction. As an example, bodies having a circular cross section, such as a fiber 34, can be treated by the plasma apparatus 32. The apparatus comprises two solid dielectric structures 2*a*, 2*b*; 2*c*, 2*d* being provided with a slit, an inter space, thus defining a gas flow path P2, P4. The solid dielectric structures 2*a*, 2*b*, 2*c*, 2*d* comprise inner spaces incorporating interior electrodes for generating a surface plasma.

It is noted that the configuration can also be designed such that more or less dielectric structures surround a treating volume, e.g. six dielectric structures.

The plasma unit according to the invention can thus be used for several applications, such as for cleaning gas or treating surfaces of structures, e.g. for improvement of adhesion, dyability and printability, for layer deposition by plasma polymerization, layer deposition by plasma assisted grafting, particle deposition, sterilization or disinfection purposes.

Figure 16:
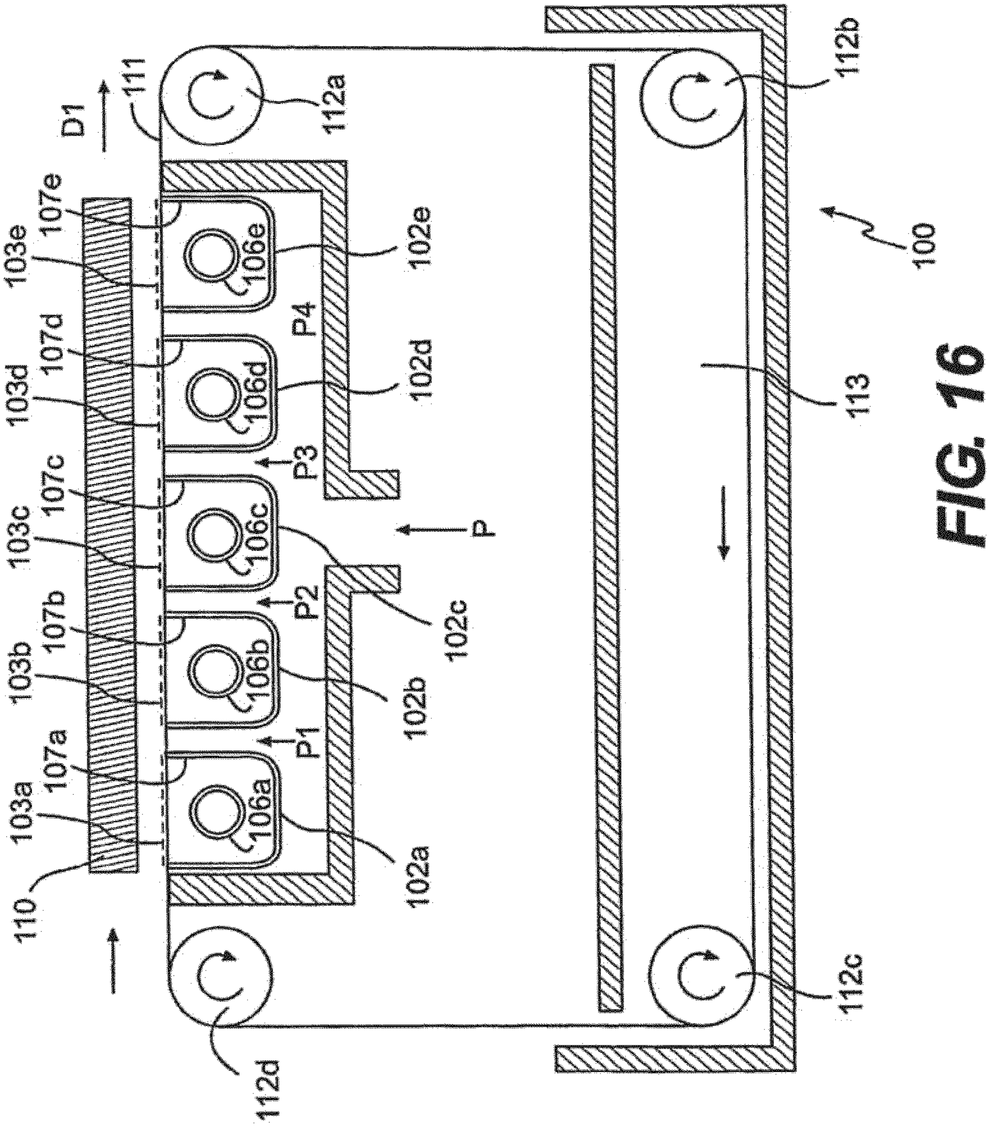
FIG. 16 shows a schematic cross sectional view of a fourteenth embodiment of a surface dielectric barrier discharge plasma unit according to the invention.

FIG. 16 shows a schematic cross sectional view of a fourteenth embodiment of a surface dielectric barrier discharge plasma unit 100 according to the invention. The unit 100 comprises a multiple number of elongated shaped solid dielectric structures 102*a-e* defining inter spaces 104*a-d* allowing gas flows P1-4 originating from a main gas flow P to flow to treating surfaces 103*a-e* where surface plasmas are induced by feeding electrodes 106*a-e* inside the dielectric structures and U-shaped exterior electrodes 107*a-e*. A substrate 110 to be treated by the plasma unit 100 is during operation of the unit 100 transported in a moving direction D1.

According to an aspect of the present invention, unwanted deposition on exterior electrodes can be counteracted by providing gas flow path sections along exterior electrodes, substantially transversely with respect to the treating surface. The exterior electrode counteracts surface plasma and therefore counteracts unwanted deposition along the gas flow path. However, in DBD treatment of gases or objects (surfaces) and even fibrous webs/fibers the formation of unwanted coatings on those solid dielectric structures and/or electrodes adjacent to those structures can occur.

In principle, an unwanted coating can be formed on the treating surfaces 103*a-e*. Similar to the method applied when using conventional planar type SDBD electrodes (without transversal gas flow paths), unwanted coating can be avoided by continuous mechanical removal by the moving substrate itself, such as foil, paper, fibrous web or bundles of fibers, etc, when it passes over the treating surface in a continuous or step-wise manner.

However, when this mechanical removal of material is absent, e.g. when treating gas, synthesizing or coating particles in a gas or when objects are treated at finite distance from the treating surface, unwanted deposition on the treating surface frequently occurs.

The unit 100 further comprises a cleaning article 111, such as a bundle of dielectric wires or fibers or very open gas permeable fibrous web along the solid dielectric structures in order to remove unwanted deposited matter. The cleaning articles 111 can in particular be used when the dielectric structure is used for gas treatment or treatment of any surfaces of objects, including powders, that can not be used or are less suitable to remove unwanted deposited matter on the treating surfaces.

In the shown embodiment, the cleaning article is moved via a roller system 112*a-d* into a cleaning chamber 113 for reuse. Alternatively or additionally, the cleaning article 111 is continuously replaced. The cleaning procedure can be applied continuously, intermittently or periodically e.g. in any absence of plasma and/or in any absence of application of the plasma for surface or gas treatment. It is preferred that the fibers/fibrous web is moved along the treating surface in two mutually independent directions in the plane of the treatment surfaces 103, in order to clean at least a significant part or the entire treating surface. Further, it is noted that the cleaning procedure of the cleaning article itself can be performed in various ways, e.g. by using a plasma treatment.

Alternatively, other cleaning devices can be used, e.g. a fixed brush. Such a cleaning device can in particular be applied in combination with a solid dielectric structure arranged as a cylinder. Either the cylinder or the cleaning device can rotationally move, or both. Since the structure is build up as various elements with separate electrodes that are couple to separate electrical power sources, the plasma can be switched off during cleaning in the particular case of a rotating cylinder configuration.

The possibility of using conductive electrode wires passing along the treating surfaces, is to be considered as well. In this case the U shaped exterior electrodes are either absent or having the same polarity as those conducting wires. Absence of U shaped electrodes is not preferred as it will cause unwanted deposition in gas flow paths which can not be easily cleaned. The idea of conducting wires to form a SDBD on the treating surface can be including as an alternative.

Figure 18:
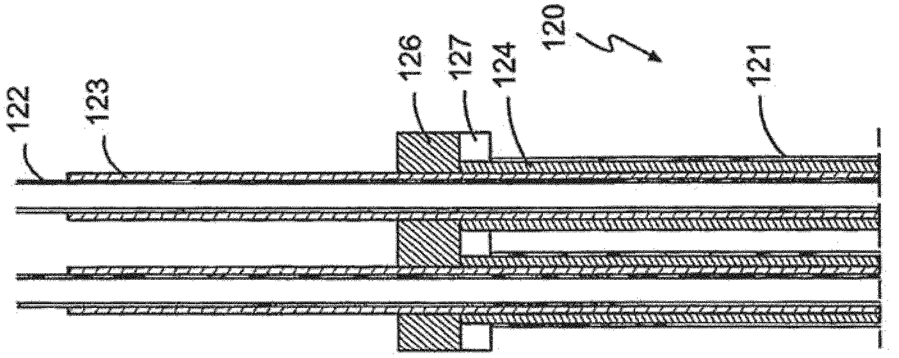
FIG. 18 shows a schematic cross sectional top view of the solid dielectric structure of FIG. 15.
Figure 17:
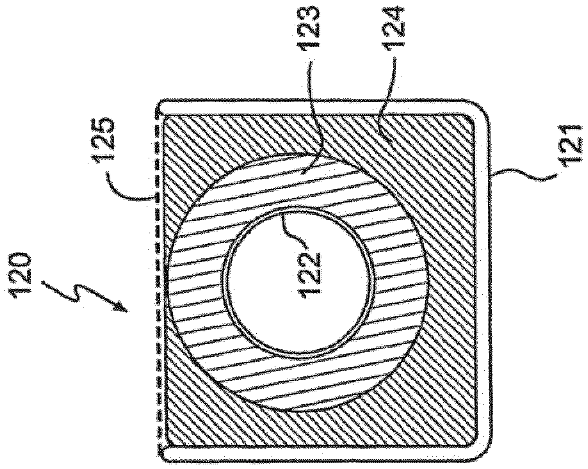
FIG. 17 shows a schematic cross sectional side view of an embodiment of a solid dielectric structure.

In order to avoid deposition of metal on the treating surfaces, it is preferred that the cleaning article comprises polymer or glass. FIG. 17 shows a schematic cross sectional side view of an embodiment of a solid dielectric structure 120 and FIG. 18 shows a schematic cross sectional top view of the solid dielectric structure of FIG. 17. The structure comprises an U-shaped exterior electrode 121 and an inner electrode 122 embedded in a dielectric 123, 124. During operation of the unit 120, a surface plasma 125 occurs at a treating side of the unit 120. In FIG. 16, two solid dielectric structures are assembled forming a single plasma unit. The unit comprises a reactor wall 126 defining an end of the treating surface 125. On the inner side of the reactor wall 126 relatively large electrodes 127 are present to limit electric fields in this area.

One option for manufacturing (not based on extrusion) is filling of the space in between the U shaped exterior electrode 121 and a central cylindrical conductor 122, the interior electrode, with a liquid material 123, 124 which is hardened after filling. The material may be glass, ceramic, glass-ceramic, epoxy or any composite material offering sufficient dielectric strength and a thermal expansion coefficient of the same magnitude as the metal used for the electrodes.

Alternatively, the space between the electrodes may be filled by means of a combination of a cylindrical ceramic or glass tube 123, comprising the interior electrode 122, and a filling dielectric material 124. Apart from offering low manufacturing costs, and high dielectric breakdown strength this structure allows a relatively easy manufacturing of high voltage feed throughs to exterior cables from the electrical power supply. By filling the intermediate space with a liquid for hardening to a solid dielectric, the occurrence of irregularities such as gas bubbles is counteracted.

It is further noted that the cylindrical ceramic or glass tube 123 extends outside the reactor wall, thus counteracting the possibility of dielectric breakdown at the boundary of the reactor and improving the robustness of the apparatus. It is also noted that in another variant, shown in FIG. 19, also the filling dielectric material 124 extends to outside the reactor wall, so that the robustness of the plasma unit is further improved.

Figure 19:
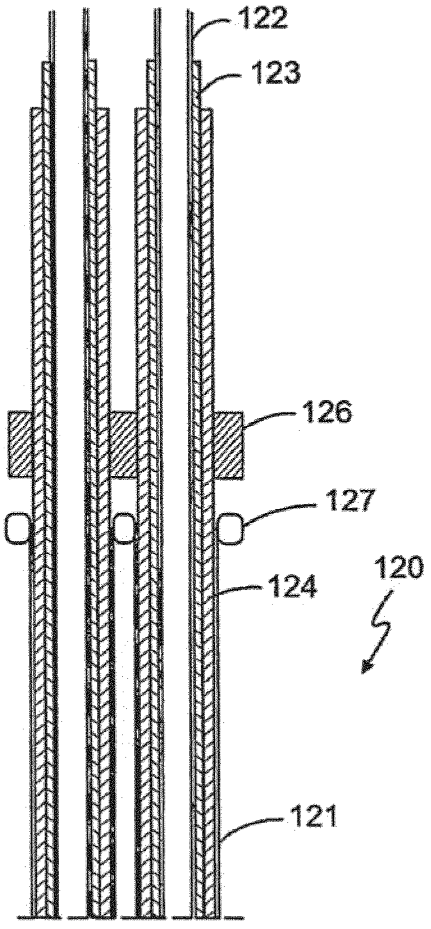
FIG. 19 shows a schematic cross sectional top view of a further solid dielectric structure.

The structures shown in FIGS. 17-19 offer advantages with respect to the manufacturing process. The metal exterior electrode has essentially a U shaped structure and the interior electrode has essentially a cylindrical structure. The dielectric barrier material can be obtained by injection moulding using a powder or liquid material comprising (a mixture of) ceramic or glass particulate matter and eventually a binder material. The material may also comprise epoxy resin with appropriate glass or ceramic additives to achieve high voltage isolation and a thermal expansion coefficient tailed to the material of the adjacent electrode materials. The powder or liquid can be injected in the U shaped exterior electrode together with the interior electrode, forming a flat treatment surface.

As an alternative, the interior electrode is first deposited as thin layer or inserted as thin metal tube in a ceramic or glass tube which has been manufactured by an extrusion process. The dielectric tube is then inserted into the U shaped structure and the space between the dielectric tube and the U shaped exterior electrode is filled by means of injection moulding. As a further alternative, the solid interior electrode material is replaced by a liquid electrolyte electrode.

Further, the U shaped electrode may comprise a thin metal sheet material which may possess better bonding/adhesion properties to the solid dielectric structure under conditions of temperature change and/or mechanical vibrations. In this particular case the edges of the U shaped metal structure may be extended with or connected to an additional elongated metal element for improved erosion and corrosion resistance of the exterior electrode (not shown in the figures).

The presented structure further offers advantages with respect to the obtained spatial structure of streamer discharges. This can be explained as follows.

Streamers are ionizing filaments which are formed in the region with maximum applied electric field and that increase their length as a function of time, along the treating surface to regions with lower applied electric field. Streamers can have a velocity in the order of $10^5$ m/s. The structure of an extending streamer can be described as a propagating and ionizing ‘streamer head’, typically having a diameter of circa 100 micrometer, bound by a conductive ‘streamer channel’ that is a weakly ionized conducting plasma between the head and the electrode where this head initially has been formed.

The propagation of the streamer head, thus lengthening of the streamer channel, depends on various factors such as the potential of the streamer head which decreases as a function of streamer length due to the voltage drop along the weakly ionized plasma channel, and the electric field of the non-ionized gas in vicinity of the propagating streamer head. Said electric field may in turn depend on the electrode geometr, the shape and electrical permittivity of the solid dielectric structure, and the charge and structure of other nearby streamer discharges (electrostatic repulsion between streamers).

In known plate shaped solid dielectric structures, the distance between the treating surface where streamers are formed and the interior electrode is constant. As a consequence, the length of streamers is limited due to the voltage drop over their length in combination with the charge of nearby streamers.

An objective of the proposed configuration of solid dielectric structure and electrodes is to form a maximum number of streamers with maximum length using a minimum voltage potential applied between the interior and exterior electrodes. It is expected that the optimized streamer discharge structure at minimum voltage is beneficial for the effectiveness and energy efficiency of the induced chemical processes.

This can be achieved as follows. In the structure shown in FIGS. 17-19 the distance between the ‘head’ of streamers and the interior electrode decreases during increase of the streamer channel length. Thus the potential loss at the streamer head, due to resistivity of the conducting channel, is compensated by an increase of the local applied electric field, in the non-ionized gas in vicinity of the propagating streamer head. Further, the local applied electric field, in vicinity of the propagating streamer head, also depends on the electrical permittivity of the dielectric material. Regarding the solid dielectric structure shown in FIGS. 17-19, this structure can be composed of two or more dielectric materials e.g. a ceramic tube that contains the interior electrode and a glass like filling material in the space in between the cylindrical tube and the U-shaped exterior electrode. When the electrical permittivity of the cylindrical tube is chosen much higher than the surrounding material, the applied electric field in the vicinity of a propagating streamer head is enhanced when it approaches the mid-region of the structure, where the thickness of the glass like filling material is relatively thin. As an example, the ceramic tube can be made of alumina ($Al_2O_3$ with a relative dielectric permitivit $\in_r=10$), the filling material can be made of a type of glass with a relative dielectric permitivit $\in_r=3\text{-}5$. Ceramic-glass composite materials with very high permittivity can be manufactured by adding materials such as Barium Titanate and/or Strontium Titanate.

Figure 20:
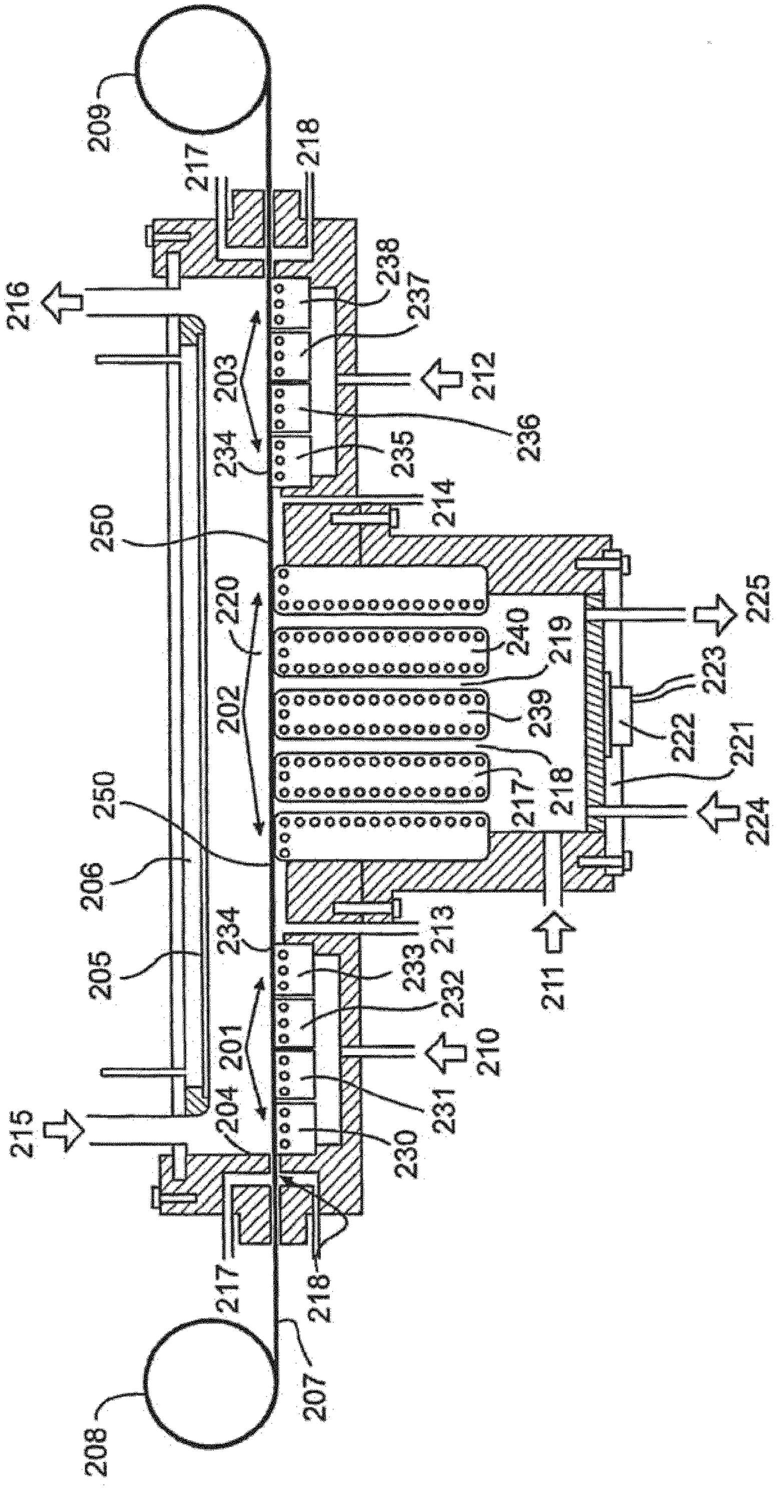
FIG. 20 shows a schematic cross sectional view of a plasma apparatus.

FIG. 20 shows a schematic cross-sectional view of a plasma apparatus according to an aspect of the invention. The reactor is provided with a first and second winding roll 208, 209 for transporting a substrate 207 along or through a number of plasma zones 201, 202, 203 along a substrate path 250. The plasma zones 201, 202, 203 comprise a plasma generating device for treating the substrate 207. In each zone 201, 202, 203 a specific treatment is carried out. In particular, in a first zone 201 a surface activation is carried out, in a second zone 202 particles, preferably nanoparticles, are deposited and attached, while in a third zone 203 a final polymerisation and/or cross-linking and strengthening of chemical bond to the substrate is performed.

It is noted that, in principle, it is not necessary to apply all described plasma zones for treating a substrate 207. As an example, the third zone can be omitted in some cases, e.g. if the attachment action in the second zone 202 appears to meet the physical requirements in a particular application. As a second example, the first zone can be omitted using plasma zone 202 alternately for substrate surface activation and particle deposition.

The plasma generating device in each plasma zone 201, 202, 203 comprises a surface dielectric barrier discharge arrangement for treating the substrate 207. A surface dielectric barrier discharge structure comprises a dielectric body 230, 231, 232, 233 wherein an appropriate part of an external surface near the substrate path 250 is covered by electrodes 234. Upon application of electric potentials to the electrodes 234, plasma filaments are generated near a surface between the electrodes 234.

In FIG. 20, the first zone 201 comprises a number of such surface dielectric barrier discharge arrangements with dielectric bodies 230, 231, 232, 233. Similarly, the third zone 203 comprises a number of surface dielectric barrier discharge arrangements having dielectric bodies 235, 236, 237, 238 and electrodes 234.

Figure 21:
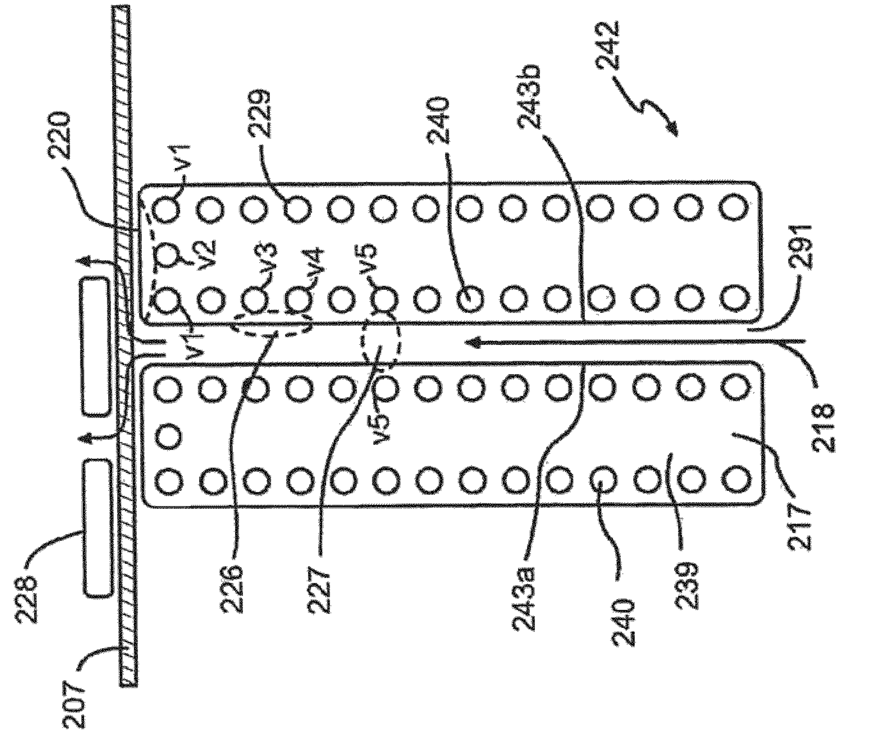
FIG. 21 shows a schematic cross sectional view of a plasma generating device.

The second zone 202 shown in FIG. 20 comprises a more complex plasma generating device that is constructed using elementary surface dielectric barrier discharge elements. A number of surface dielectric barrier discharge elements 242 having dielectric bodies 239 that are arranged in parallel defining channels 241 between opposite external surfaces 243A, 243B of adjacent surface dielectric barrier discharge elements 242, the mentioned opposite external surfaces 243A, 243B being at least covered by electrodes 240 as shown in FIG. 21 depicting a schematic cross sectional view of a plasma generating device in zone 202 of the reactor.

Preferably, ends of the dielectric bodies 239 are positioned near the substrate path 250. Optionally, an end surface of the dielectric bodies 239 near the substrate path 250 is provided with electrodes v1, v2 to generate plasma filaments near the substrate 207 to be treated.

By applying voltage potentials to electrodes v3, v4 located on an external single surface 243B a surface plasma filament discharge 226 is generated in the channel 241. Further, by applying a voltage potential to electrodes v5, v6 located on opposite external surfaces 243A, 243B a volume plasma filament discharge 227 is generated in the channel 241. Thus, by driving selected electrodes in the plasma generating device in zone 202 of the reactor, different types of discharges can be generated at pre-selected locations in a particle flow channel 241.

In the particle flow channel 241 particles are flown to the substrate 207 to be treated. If desired, such particles can be pre-treated in the channel 241 as described herein. By generating surface discharges, an instant local increase in temperature is created. Further pressure waves are generated having a frequency according to a voltage frequency that is applied to the electrodes, the frequency being e.g. in a range of approximately 0.1 to 100 kHz. The phenomenon of local temperature increase caused by surface discharges can be used for plasma induced thermophoresis and has the effect that a force is exerted to solid and/or liquid particles driving them away from the surface 243A, 243B of the dielectric bodies 239.

The invention is not restricted to the embodiments described herein. It will be understood that many variants are possible.

Instead of using an interior electrode and a further, exterior electrode being arranged adjacent to an exterior surface of the solid dielectric structure for generating a surface dielectric barrier discharge plasma, also a pair of interior electrodes can be used for generating a surface plasma. Further, if an exterior electrode is used, the electrode can be placed in direct contact with the solid dielectric structure or adjacent thereto for generating a surface plasma.

The embodiments described above comprise interior spaces that in cross sectional view are circular shaped. However, also other shapes can be applied, e.g. square shaped interior spaces.

It is noted that the embodiments shown in FIGS. 6, 9, 10 and 12 can be modified so that a treating surface of the dielectric structure is free of electrodes and that side exterior surfaces are at least partially covered by exterior electrodes.

Other such variants will be obvious for the person skilled in the art and are considered to lie within the scope of the invention as formulated in the following claims.

The invention claimed is:

1. A surface dielectric barrier discharge plasma unit comprising:

a solid dielectric structure provided with an interior space wherein an interior electrode is arranged, further comprising an exterior electrode for generating in concert with the interior electrode a surface dielectric barrier discharge plasma;

a gas flow path along a surface of the solid dielectric structure and wherein the gas flow path is oriented substantially transverse with respect to a treating plane of the solid dielectric structure;

wherein the solid dielectric structure substantially has an elongate shape having a top surface, defined as an exterior treating surface during operation of the unit, and an exterior side surface extending from the top surface and substantially transverse thereto, along which side surface at least a part of the gas flow path is located; wherein the gas flow path is oriented substantially transverse with respect to the top surface of the solid dielectric structure; and wherein the exterior side surface of the solid dielectric structure is at least partially covered by the exterior electrode;

a cap structure surrounding the solid dielectric structure, opposite to the top surface, the cap structure being provided with an entry for flowing gas towards gas path along exterior side surfaces of the solid dielectric structure; and a conveyor configured to carry objects to be treated along and parallel to the top surface in a direction of a treatment path for the objects.

2. A plasma unit according to claim 1, wherein the treating plane is free of electrodes.

3. A plasma unit according to claim 1, wherein the interior electrode is implemented as an electrolyte.

4. A plasma unit according to claim 3, wherein the electrolyte further serves as a temperature conditioning fluid.

5. A plasma unit according to claim 1, wherein the interior electrode is enclosed by an electrical conductor.

6. A plasma unit according claim 1, wherein the solid dielectric structure comprises an opening through which at least a part of the gas flow path extends.

7. A plasma unit according to claim 1, wherein the solid dielectric structure is substantially plate shaped, the structure being provided with a slit through which slit the gas flow path extends.

8. A plasma unit according to claim 1, wherein the solid dielectric structure is provided with a multiple number of slits each of them defining at least a part of a gas flow path.

9. A plasma unit according to claim 1, wherein the interior space in the solid dielectric structure has been manufactured by an extruding process.

10. A plasma unit according to claim 1, wherein the solid dielectric structure comprises a multiple number of separate interior spaces, at least one of them merely serving as a temperature conditioning fluid channel.

11. A plasma unit according to claim 1, further comprising an electrically conducting, earthed and perforated plate extending at least partially along the treating plane.

12. A plasma unit according to claim 1, wherein the treating plane is covered by a gas adsorbing, porous, electrically isolating layer.

13. A plasma unit according to claim 1, wherein the exterior electrode is connected to earth.

14. A plasma unit according to claim 1, wherein at least a portion of the solid dielectric structure is covered by a porous, electrically isolating layer and wherein the exterior electrode extends into the porous, electrically isolating layer.

15. A plasma unit according to claim 1, wherein the exterior electrode is configured to generate, together with the interior electrode, a continuous surface dielectric barrier discharge plasma along the treatment path.

16. A plasma unit according to claim 1, wherein the solid dielectric structure is a single piece.

17. A plasma unit according to claim 1, further comprising an assembly of a multiple number of solid dielectric structures substantially arranged in parallel such that the exterior treating surface of each solid dielectric structure substantially extends in a common treating plane, wherein an inter space between adjacent solid dielectric structures defines at least a part of the gas flow path.

* * * * *